US008132250B2

(12) United States Patent
Judge et al.

(10) Patent No.: US 8,132,250 B2
(45) Date of Patent: Mar. 6, 2012

(54) MESSAGE PROFILING SYSTEMS AND METHODS

(75) Inventors: Paul Judge, Alpharetta, GA (US); Guru Rajan, Duluth, GA (US); Dmitri Alperovitch, Atlanta, GA (US); Matt Moyer, Lawrenceville, GA (US); Sven Krasser, Atlanta, GA (US)

(73) Assignee: McAfee, Inc., Santa Clara, CA (US)

( * ) Notice: Subject to any disclaimer, the term of this patent is extended or adjusted under 35 U.S.C. 154(b) by 1550 days.

(21) Appl. No.: 11/173,941

(22) Filed: Jul. 1, 2005

(65) Prior Publication Data

US 2006/0015563 A1 Jan. 19, 2006

Related U.S. Application Data

(63) Continuation-in-part of application No. 11/142,943, filed on Jun. 2, 2005, and a continuation-in-part of application No. 10/093,553, filed on Mar. 8, 2002, now Pat. No. 6,941,467, and a continuation-in-part of application No. 10/094,211, filed on Mar. 8, 2002, and a continuation-in-part of application No. 10/094,266, filed on Mar. 8, 2002, now Pat. No. 7,124,438, and a continuation-in-part of application No. 10/361,091, filed on Feb. 7, 2003, now Pat. No. 7,096,498, and a continuation-in-part of application No. 10/373,325, filed on Feb. 24, 2003, now Pat. No. 7,213,260, and a continuation-in-part of application No. 10/361,067, filed on Feb. 7, 2003, now abandoned, and a continuation-in-part of application No. 10/384,924, filed on Mar. 6, 2003.

(60) Provisional application No. 60/625,507, filed on Nov. 5, 2004.

(51) Int. Cl.
*G06F 15/16* (2006.01)
(52) U.S. Cl. ................. 726/13; 726/22; 726/23; 726/24
(58) Field of Classification Search ................... 726/13
See application file for complete search history.

(56) References Cited

U.S. PATENT DOCUMENTS 4,289,930 A 9/1981 Connolly et al.
(Continued)

FOREIGN PATENT DOCUMENTS

CA 2564533 12/2005
(Continued)

OTHER PUBLICATIONS

Feitelson et al.; Self-Tuning Systems, Mar./Apr. 1999, IEEE, 0740-7459/99, pp. 52-60.*

(Continued)

*Primary Examiner* — Kaveh Abrishamkar
(74) *Attorney, Agent, or Firm* — Fish & Richardson P.C.

(57) ABSTRACT

Methods and systems for operation upon one or more data processors that classify communications from messaging entities. A method can include receiving a communication that was sent from a messaging entity. A plurality of message classification techniques is used to classify the communication. Each message classification technique is associated with a confidence value which is used in generating a message classification output from the message classification technique. The message classification outputs are combined in order to generate a message profile score. The message profile score is used in deciding what action is to be taken with respect to the communication associated with the messaging entity.

40 Claims, 10 Drawing Sheets

U.S. PATENT DOCUMENTS

| | | | |
|---|---|---|---|
| 4,384,325 A | 5/1983 | Slechta et al. |
| 4,386,416 A | 5/1983 | Giltner et al. |
| 4,532,588 A | 7/1985 | Foster |
| 4,713,780 A | 12/1987 | Schultz et al. |
| 4,754,428 A | 6/1988 | Schultz et al. |
| 4,837,798 A | 6/1989 | Cohen et al. |
| 4,853,961 A | 8/1989 | Pastor |
| 4,864,573 A | 9/1989 | Horsten |
| 4,951,196 A | 8/1990 | Jackson |
| 4,975,950 A | 12/1990 | Lentz |
| 4,979,210 A | 12/1990 | Nagata et al. |
| 5,008,814 A | 4/1991 | Mathur |
| 5,020,059 A | 5/1991 | Gorin et al. |
| 5,051,886 A | 9/1991 | Kawaguchi et al. |
| 5,054,096 A | 10/1991 | Beizer |
| 5,105,184 A | 4/1992 | Pirani et al. |
| 5,119,465 A | 6/1992 | Jack et al. |
| 5,144,557 A | 9/1992 | Wang |
| 5,144,659 A | 9/1992 | Jones |
| 5,144,660 A | 9/1992 | Rose |
| 5,167,011 A | 11/1992 | Priest |
| 5,210,824 A | 5/1993 | Putz et al. |
| 5,210,825 A | 5/1993 | Kavaler |
| 5,235,642 A | 8/1993 | Wobber et al. |
| 5,239,466 A | 8/1993 | Morgan et al. |
| 5,247,661 A | 9/1993 | Hager et al. |
| 5,276,869 A | 1/1994 | Forrest et al. |
| 5,278,901 A | 1/1994 | Shieh et al. |
| 5,283,887 A | 2/1994 | Zachery |
| 5,293,250 A | 3/1994 | Okumura et al. |
| 5,313,521 A | 5/1994 | Torii et al. |
| 5,319,776 A | 6/1994 | Hile et al. |
| 5,355,472 A | 10/1994 | Lewis |
| 5,367,621 A | 11/1994 | Cohen et al. |
| 5,377,354 A | 12/1994 | Scannell et al. |
| 5,379,340 A | 1/1995 | Overend et al. |
| 5,379,374 A | 1/1995 | Ishizaki et al. |
| 5,404,231 A | 4/1995 | Bloomfield |
| 5,406,557 A | 4/1995 | Baudoin |
| 5,414,833 A | 5/1995 | Hershey et al. |
| 5,416,842 A | 5/1995 | Aziz |
| 5,418,908 A | 5/1995 | Keller et al. |
| 5,424,724 A | 6/1995 | Williams et al. |
| 5,479,411 A | 12/1995 | Klein |
| 5,481,312 A | 1/1996 | Cash et al. |
| 5,483,466 A | 1/1996 | Kawahara et al. |
| 5,485,409 A | 1/1996 | Gupta et al. |
| 5,495,610 A | 2/1996 | Shing et al. |
| 5,509,074 A | 4/1996 | Choudhury et al. |
| 5,511,122 A | 4/1996 | Atkinson |
| 5,513,126 A | 4/1996 | Harkins et al. |
| 5,513,323 A | 4/1996 | Williams et al. |
| 5,530,852 A | 6/1996 | Meske, Jr. et al. |
| 5,535,276 A | 7/1996 | Ganesan |
| 5,541,993 A | 7/1996 | Fan et al. |
| 5,544,320 A | 8/1996 | Konrad |
| 5,550,984 A | 8/1996 | Gelb |
| 5,550,994 A | 8/1996 | Tashiro et al. |
| 5,557,742 A | 9/1996 | Smaha et al. |
| 5,572,643 A | 11/1996 | Judson |
| 5,577,209 A | 11/1996 | Boyle et al. |
| 5,602,918 A | 2/1997 | Chen et al. |
| 5,606,668 A | 2/1997 | Shwed |
| 5,608,819 A | 3/1997 | Ikeuchi |
| 5,608,874 A | 3/1997 | Ogawa et al. |
| 5,619,648 A | 4/1997 | Canale et al. |
| 5,632,011 A | 5/1997 | Landfield et al. |
| 5,638,487 A | 6/1997 | Chigler |
| 5,644,404 A | 7/1997 | Hashimoto et al. |
| 5,657,461 A | 8/1997 | Harkins et al. |
| 5,673,322 A | 9/1997 | Pepe et al. |
| 5,675,507 A | 10/1997 | Bobo, II |
| 5,675,733 A | 10/1997 | Williams |
| 5,677,955 A | 10/1997 | Doggett et al. |
| 5,694,616 A | 12/1997 | Johnson et al. |
| 5,696,822 A | 12/1997 | Nachenberg |
| 5,706,442 A | 1/1998 | Anderson et al. |
| 5,708,780 A | 1/1998 | Levergood et al. |
| 5,708,826 A | 1/1998 | Ikeda et al. |
| 5,710,883 A | 1/1998 | Hong et al. |
| 5,727,156 A | 3/1998 | Herr-Hoyman et al. |
| 5,740,231 A | 4/1998 | Cohn et al. |
| 5,742,759 A | 4/1998 | Nessett et al. |
| 5,742,769 A | 4/1998 | Lee et al. |
| 5,745,574 A | 4/1998 | Muftic |
| 5,751,956 A | 5/1998 | Kirsch |
| 5,758,343 A | 5/1998 | Vigil et al. |
| 5,764,906 A | 6/1998 | Edelstein et al. |
| 5,768,528 A | 6/1998 | Stumm |
| 5,771,348 A | 6/1998 | Kubatzki et al. |
| 5,778,372 A | 7/1998 | Cordell et al. |
| 5,781,857 A | 7/1998 | Hwang et al. |
| 5,781,901 A | 7/1998 | Kuzma |
| 5,790,789 A | 8/1998 | Suarez |
| 5,790,790 A | 8/1998 | Smith et al. |
| 5,790,793 A | 8/1998 | Higley |
| 5,793,763 A | 8/1998 | Mayes et al. |
| 5,793,972 A | 8/1998 | Shane |
| 5,796,942 A | 8/1998 | Esbensen |
| 5,796,948 A | 8/1998 | Cohen |
| 5,801,700 A | 9/1998 | Ferguson |
| 5,805,719 A | 9/1998 | Pare, Jr. et al. |
| 5,812,398 A | 9/1998 | Nielsen |
| 5,812,776 A | 9/1998 | Gifford |
| 5,822,526 A | 10/1998 | Waskiewicz |
| 5,822,527 A | 10/1998 | Post |
| 5,826,013 A | 10/1998 | Nachenberg |
| 5,826,014 A | 10/1998 | Coley et al. |
| 5,826,022 A | 10/1998 | Nielsen |
| 5,826,029 A | 10/1998 | Gore, Jr. et al. |
| 5,835,087 A | 11/1998 | Herz et al. |
| 5,845,084 A | 12/1998 | Cordell et al. |
| 5,850,442 A | 12/1998 | Muftic |
| 5,855,020 A | 12/1998 | Kirsch |
| 5,860,068 A | 1/1999 | Cook |
| 5,862,325 A | 1/1999 | Reed et al. |
| 5,864,852 A | 1/1999 | Luotonen |
| 5,878,230 A | 3/1999 | Weber et al. |
| 5,884,033 A | 3/1999 | Duvall et al. |
| 5,892,825 A | 4/1999 | Mages et al. |
| 5,893,114 A | 4/1999 | Hashimoto et al. |
| 5,896,499 A | 4/1999 | McKelvey |
| 5,898,836 A | 4/1999 | Freivald et al. |
| 5,903,723 A | 5/1999 | Becker et al. |
| 5,911,776 A | 6/1999 | Guck |
| 5,923,846 A | 7/1999 | Gage et al. |
| 5,930,479 A | 7/1999 | Hall |
| 5,933,478 A | 8/1999 | Ozaki et al. |
| 5,933,498 A | 8/1999 | Schneck et al. |
| 5,937,164 A | 8/1999 | Mages et al. |
| 5,940,591 A | 8/1999 | Boyle et al. |
| 5,948,062 A | 9/1999 | Tzelnic et al. |
| 5,958,005 A | 9/1999 | Thorne et al. |
| 5,963,915 A | 10/1999 | Kirsch |
| 5,978,799 A | 11/1999 | Hirsch |
| 5,987,609 A | 11/1999 | Hasebe |
| 5,991,881 A | 11/1999 | Conklin et al. |
| 5,999,932 A | 12/1999 | Paul |
| 6,003,027 A | 12/1999 | Prager |
| 6,006,329 A | 12/1999 | Chi |
| 6,012,144 A | 1/2000 | Pickett |
| 6,014,651 A | 1/2000 | Crawford |
| 6,023,723 A | 2/2000 | McCormick et al. |
| 6,029,256 A | 2/2000 | Kouznetsov |
| 6,035,423 A | 3/2000 | Hodges et al. |
| 6,052,709 A | 4/2000 | Paul |
| 6,058,381 A | 5/2000 | Nelson |
| 6,058,482 A | 5/2000 | Liu |
| 6,061,448 A | 5/2000 | Smith et al. |
| 6,061,722 A | 5/2000 | Lipa et al. |
| 6,072,942 A | 6/2000 | Stockwell et al. |
| 6,092,114 A | 7/2000 | Shaffer et al. |
| 6,092,194 A | 7/2000 | Touboul |
| 6,094,277 A | 7/2000 | Toyoda |
| 6,094,731 A | 7/2000 | Waldin et al. |
| 6,104,500 A | 8/2000 | Alam et al. |
| 6,108,688 A | 8/2000 | Nielsen |

| | | |
|---|---|---|
| 6,108,691 A | 8/2000 | Lee et al. |
| 6,108,786 A | 8/2000 | Knowlson |
| 6,118,856 A | 9/2000 | Paarsmarkt et al. |
| 6,119,137 A | 9/2000 | Smith et al. |
| 6,119,142 A | 9/2000 | Kosaka |
| 6,119,230 A | 9/2000 | Carter |
| 6,119,236 A | 9/2000 | Shipley |
| 6,122,661 A | 9/2000 | Stedman et al. |
| 6,141,695 A | 10/2000 | Sekiguchi et al. |
| 6,141,778 A | 10/2000 | Kane et al. |
| 6,145,083 A | 11/2000 | Shaffer et al. |
| 6,151,675 A | 11/2000 | Smith |
| 6,161,130 A * | 12/2000 | Horvitz et al. ................. 709/206 |
| 6,185,689 B1 | 2/2001 | Todd, Sr. et al. |
| 6,192,407 B1 | 2/2001 | Smith et al. |
| 6,199,102 B1 | 3/2001 | Cobb |
| 6,202,157 B1 | 3/2001 | Brownlie et al. |
| 6,219,714 B1 | 4/2001 | Inhwan et al. |
| 6,223,213 B1 | 4/2001 | Cleron et al. |
| 6,249,575 B1 | 6/2001 | Heilmann et al. |
| 6,249,807 B1 | 6/2001 | Shaw et al. |
| 6,260,043 B1 | 7/2001 | Puri et al. |
| 6,266,668 B1 * | 7/2001 | Vanderveldt et al. ........... 707/10 |
| 6,269,447 B1 | 7/2001 | Maloney et al. |
| 6,269,456 B1 | 7/2001 | Hodges et al. |
| 6,272,532 B1 | 8/2001 | Feinleib |
| 6,275,942 B1 | 8/2001 | Bernhard et al. |
| 6,279,113 B1 | 8/2001 | Vaidya |
| 6,279,133 B1 | 8/2001 | Vafai et al. |
| 6,282,565 B1 | 8/2001 | Shaw et al. |
| 6,285,991 B1 | 9/2001 | Powar |
| 6,289,214 B1 | 9/2001 | Backstrom |
| 6,298,445 B1 | 10/2001 | Shostack et al. |
| 6,301,668 B1 | 10/2001 | Gleichauf et al. |
| 6,304,898 B1 | 10/2001 | Shiigi |
| 6,304,973 B1 | 10/2001 | Williams |
| 6,311,207 B1 | 10/2001 | Mighdoll et al. |
| 6,317,829 B1 | 11/2001 | Van Oorschot |
| 6,320,948 B1 | 11/2001 | Heilmann et al. |
| 6,321,267 B1 | 11/2001 | Donaldson |
| 6,324,569 B1 | 11/2001 | Ogilvie et al. |
| 6,324,647 B1 | 11/2001 | Bowman-Amuah |
| 6,324,656 B1 | 11/2001 | Gleichauf et al. |
| 6,330,589 B1 | 12/2001 | Kennedy |
| 6,347,374 B1 | 2/2002 | Drake et al. |
| 6,353,886 B1 | 3/2002 | Howard et al. |
| 6,363,489 B1 | 3/2002 | Comay et al. |
| 6,370,648 B1 | 4/2002 | Diep |
| 6,373,950 B1 | 4/2002 | Rowney |
| 6,385,655 B1 | 5/2002 | Smith et al. |
| 6,393,465 B2 | 5/2002 | Leeds |
| 6,393,568 B1 | 5/2002 | Ranger et al. |
| 6,405,318 B1 | 6/2002 | Rowland |
| 6,442,588 B1 | 8/2002 | Clark et al. |
| 6,442,686 B1 | 8/2002 | McArdle et al. |
| 6,453,345 B2 | 9/2002 | Trcka et al. |
| 6,460,141 B1 | 10/2002 | Olden |
| 6,470,086 B1 | 10/2002 | Smith |
| 6,487,599 B1 | 11/2002 | Smith et al. |
| 6,487,666 B1 | 11/2002 | Shanklin et al. |
| 6,502,191 B1 | 12/2002 | Smith et al. |
| 6,516,411 B2 | 2/2003 | Smith |
| 6,519,703 B1 | 2/2003 | Joyce |
| 6,539,430 B1 | 3/2003 | Humes |
| 6,546,416 B1 | 4/2003 | Kirsch |
| 6,546,493 B1 | 4/2003 | Magdych et al. |
| 6,550,012 B1 | 4/2003 | Villa et al. |
| 6,574,737 B1 | 6/2003 | Kingsford et al. |
| 6,578,025 B1 | 6/2003 | Pollack et al. |
| 6,609,196 B1 | 8/2003 | Dickinson, III et al. |
| 6,650,890 B1 | 11/2003 | Iriam et al. |
| 6,654,787 B1 | 11/2003 | Aronson et al. |
| 6,675,153 B1 | 1/2004 | Cook et al. |
| 6,681,331 B1 | 1/2004 | Munson et al. |
| 6,687,687 B1 | 2/2004 | Smadja |
| 6,697,950 B1 | 2/2004 | Kouznetsov |
| 6,701,440 B1 | 3/2004 | Kim et al. |
| 6,704,874 B1 | 3/2004 | Porras et al. |
| 6,711,127 B1 | 3/2004 | Gorman et al. |
| 6,725,377 B1 | 4/2004 | Kouznetsov |
| 6,732,101 B1 | 5/2004 | Cook |
| 6,732,157 B1 | 5/2004 | Gordon et al. |
| 6,735,703 B1 | 5/2004 | Kilpatrick et al. |
| 6,738,462 B1 | 5/2004 | Brunson |
| 6,742,124 B1 | 5/2004 | Kilpatrick et al. |
| 6,742,128 B1 | 5/2004 | Joiner |
| 6,754,705 B2 | 6/2004 | Joiner et al. |
| 6,757,830 B1 | 6/2004 | Tarbotton et al. |
| 6,768,991 B2 | 7/2004 | Hearnden |
| 6,769,016 B2 | 7/2004 | Rothwell et al. |
| 6,775,657 B1 | 8/2004 | Baker |
| 6,792,546 B1 | 9/2004 | Shanklin et al. |
| 6,892,178 B1 | 5/2005 | Zacharia |
| 6,892,179 B1 | 5/2005 | Zacharia |
| 6,892,237 B1 | 5/2005 | Gai et al. |
| 6,895,385 B1 | 5/2005 | Zacharia et al. |
| 6,907,430 B2 | 6/2005 | Chong et al. |
| 6,910,135 B1 | 6/2005 | Grainger |
| 6,928,556 B2 | 8/2005 | Black et al. |
| 6,941,348 B2 | 9/2005 | Petry et al. |
| 6,941,467 B2 | 9/2005 | Judge et al. |
| 6,968,461 B1 | 11/2005 | Lucas et al. |
| 7,051,077 B2 * | 5/2006 | Lin ............... 709/207 |
| 7,624,448 B2 * | 11/2009 | Coffman ........................ 726/23 |
| 7,870,203 B2 * | 1/2011 | Judge et al. .................. 709/206 |
| 2001/0049793 A1 | 12/2001 | Sugimoto |
| 2002/0004902 A1 | 1/2002 | Toh et al. |
| 2002/0016910 A1 | 2/2002 | Wright et al. |
| 2002/0023140 A1 | 2/2002 | Hile et al. |
| 2002/0026591 A1 | 2/2002 | Hartley et al. |
| 2002/0032871 A1 | 3/2002 | Malan et al. |
| 2002/0035683 A1 | 3/2002 | Kaashoek et al. |
| 2002/0042876 A1 | 4/2002 | Smith |
| 2002/0046041 A1 | 4/2002 | Lang |
| 2002/0049853 A1 | 4/2002 | Chu et al. |
| 2002/0078382 A1 | 6/2002 | Sheikh et al. |
| 2002/0087882 A1 | 7/2002 | Schneier et al. |
| 2002/0095492 A1 | 7/2002 | Kaashoek et al. |
| 2002/0112185 A1 | 8/2002 | Hodges |
| 2002/0116627 A1 | 8/2002 | Tarbotton et al. |
| 2002/0120853 A1 | 8/2002 | Tyree |
| 2002/0133365 A1 | 9/2002 | Grey et al. |
| 2002/0138416 A1 | 9/2002 | Lovejoy et al. |
| 2002/0138755 A1 | 9/2002 | Ko |
| 2002/0138759 A1 | 9/2002 | Dutta |
| 2002/0138762 A1 | 9/2002 | Horne |
| 2002/0143963 A1 | 10/2002 | Converse et al. |
| 2002/0147734 A1 | 10/2002 | Shoup et al. |
| 2002/0152399 A1 | 10/2002 | Smith |
| 2002/0165971 A1 | 11/2002 | Baron |
| 2002/0169954 A1 | 11/2002 | Bandini et al. |
| 2002/0172367 A1 | 11/2002 | Mulder et al. |
| 2002/0178227 A1 | 11/2002 | Matsa et al. |
| 2002/0178383 A1 | 11/2002 | Hrabik et al. |
| 2002/0188864 A1 | 12/2002 | Jackson |
| 2002/0194469 A1 | 12/2002 | Dominique et al. |
| 2002/0199095 A1 | 12/2002 | Bandini et al. |
| 2003/0005326 A1 | 1/2003 | Flemming |
| 2003/0009554 A1 | 1/2003 | Burch et al. |
| 2003/0009693 A1 | 1/2003 | Brock et al. |
| 2003/0009696 A1 | 1/2003 | Bunker, V et al. |
| 2003/0009699 A1 | 1/2003 | Gupta et al. |
| 2003/0014664 A1 | 1/2003 | Hentunen |
| 2003/0023692 A1 | 1/2003 | Moroo |
| 2003/0023695 A1 | 1/2003 | Kobata et al. |
| 2003/0023873 A1 | 1/2003 | Ben-Itzhak |
| 2003/0023874 A1 | 1/2003 | Prokupets et al. |
| 2003/0023875 A1 | 1/2003 | Hursey et al. |
| 2003/0028803 A1 | 2/2003 | Bunker, V et al. |
| 2003/0033516 A1 | 2/2003 | Howard et al. |
| 2003/0033542 A1 | 2/2003 | Goseva-Popstojanova et al. |
| 2003/0041264 A1 | 2/2003 | Black et al. |
| 2003/0051026 A1 | 3/2003 | Carter et al. |
| 2003/0051163 A1 | 3/2003 | Bidaud |
| 2003/0051168 A1 | 3/2003 | King et al. |
| 2003/0055931 A1 | 3/2003 | Cravo De Almeida et al. |
| 2003/0061506 A1 | 3/2003 | Cooper et al. |
| 2003/0065943 A1 | 4/2003 | Geis et al. |

| | | | |
|---|---|---|---|
| 2003/0084280 A1 | 5/2003 | Bryan et al. | |
| 2003/0084320 A1 | 5/2003 | Tarquini et al. | |
| 2003/0084323 A1 | 5/2003 | Gales | |
| 2003/0084347 A1 | 5/2003 | Luzzatto | |
| 2003/0088792 A1 | 5/2003 | Card et al. | |
| 2003/0093667 A1 | 5/2003 | Dutta et al. | |
| 2003/0093695 A1 | 5/2003 | Dutta | |
| 2003/0093696 A1 | 5/2003 | Sugimoto | |
| 2003/0095555 A1 | 5/2003 | McNamara et al. | |
| 2003/0097439 A1 | 5/2003 | Strayer et al. | |
| 2003/0097564 A1 | 5/2003 | Tewari et al. | |
| 2003/0105976 A1 | 6/2003 | Copeland, III | |
| 2003/0110392 A1 | 6/2003 | Aucsmith et al. | |
| 2003/0110396 A1 | 6/2003 | Lewis et al. | |
| 2003/0115485 A1 | 6/2003 | Milliken | |
| 2003/0115486 A1 | 6/2003 | Choi et al. | |
| 2003/0123665 A1 | 7/2003 | Dunstan et al. | |
| 2003/0126464 A1 | 7/2003 | McDaniel et al. | |
| 2003/0126472 A1 | 7/2003 | Banzhof | |
| 2003/0135749 A1 | 7/2003 | Gales et al. | |
| 2003/0140137 A1 | 7/2003 | Joiner et al. | |
| 2003/0140250 A1 | 7/2003 | Taninaka et al. | |
| 2003/0145212 A1 | 7/2003 | Crumly | |
| 2003/0145225 A1 | 7/2003 | Bruton, III et al. | |
| 2003/0145226 A1 | 7/2003 | Bruton, III et al. | |
| 2003/0149887 A1 | 8/2003 | Yadav | |
| 2003/0149888 A1 | 8/2003 | Yadav | |
| 2003/0154393 A1 | 8/2003 | Young | |
| 2003/0154399 A1 | 8/2003 | Zuk et al. | |
| 2003/0154402 A1 | 8/2003 | Pandit et al. | |
| 2003/0158905 A1 | 8/2003 | Petry et al. | |
| 2003/0159069 A1 | 8/2003 | Choi et al. | |
| 2003/0159070 A1 | 8/2003 | Mayer et al. | |
| 2003/0167402 A1 | 9/2003 | Stolfo et al. | |
| 2003/0172166 A1 | 9/2003 | Judge et al. | |
| 2003/0172167 A1 | 9/2003 | Judge et al. | |
| 2003/0172289 A1 | 9/2003 | Soppera | |
| 2003/0172291 A1 | 9/2003 | Judge et al. | |
| 2003/0172292 A1 | 9/2003 | Judge | |
| 2003/0172294 A1 | 9/2003 | Judge | |
| 2003/0172301 A1 | 9/2003 | Judge et al. | |
| 2003/0172302 A1 | 9/2003 | Judge et al. | |
| 2003/0187996 A1 | 10/2003 | Cardina et al. | |
| 2003/0212791 A1 | 11/2003 | Pickup | |
| 2003/0233328 A1 | 12/2003 | Scott et al. | |
| 2004/0015554 A1 | 1/2004 | Wilson | |
| 2004/0025044 A1 | 2/2004 | Day | |
| 2004/0054886 A1 | 3/2004 | Dickinson et al. | |
| 2004/0058673 A1 | 3/2004 | Iriam et al. | |
| 2004/0059811 A1 | 3/2004 | Sugauchi et al. | |
| 2004/0088570 A1 | 5/2004 | Roberts et al. | |
| 2004/0111531 A1 | 6/2004 | Staniford et al. | |
| 2004/0139160 A1 | 7/2004 | Wallace et al. | |
| 2004/0139334 A1 | 7/2004 | Wiseman | |
| 2004/0177120 A1 | 9/2004 | Steven | |
| 2004/0203589 A1 | 10/2004 | Wang et al. | |
| 2004/0205135 A1 | 10/2004 | Hallam-Baker et al. | |
| 2004/0267893 A1 | 12/2004 | Lin | |
| 2005/0021738 A1 | 1/2005 | Goeller et al. | |
| 2005/0052998 A1 | 3/2005 | Oliver et al. | |
| 2005/0065810 A1 | 3/2005 | Bouron | |
| 2005/0102366 A1* | 5/2005 | Kirsch | 709/207 |
| 2005/0262209 A1 | 11/2005 | Yu | |
| 2005/0262210 A1 | 11/2005 | Yu | |
| 2006/0036727 A1 | 2/2006 | Kurapati et al. | |
| 2006/0042483 A1 | 3/2006 | Work et al. | |
| 2006/0047794 A1* | 3/2006 | Jezierski | 709/221 |
| 2006/0095404 A1 | 5/2006 | Adelman et al. | |
| 2006/0123083 A1 | 6/2006 | Goutte et al. | |
| 2006/0212925 A1 | 9/2006 | Shull et al. | |
| 2006/0212930 A1 | 9/2006 | Shull et al. | |
| 2006/0212931 A1 | 9/2006 | Shull et al. | |
| 2006/0230039 A1 | 10/2006 | Shull et al. | |
| 2006/0253458 A1 | 11/2006 | Dixon et al. | |

FOREIGN PATENT DOCUMENTS

| | | |
|---|---|---|
| EP | 0375138 A2 | 6/1990 |
| EP | 0413537 A2 | 2/1991 |
| EP | 0420779 A2 | 4/1991 |
| EP | 0720333 A2 | 7/1996 |
| EP | 0838774 A2 | 4/1998 |
| EP | 0869652 A2 | 10/1998 |
| EP | 0907120 A2 | 4/1999 |
| EP | 1326376 | 7/2003 |
| EP | 1271846 | 7/2005 |
| GB | 2271002 A | 3/1994 |
| JP | 18350870 | 12/2006 |
| KR | 2006-0012137 | 2/2006 |
| KR | 1020060041934 | 5/2006 |
| WO | WO 96/35994 A1 | 11/1996 |
| WO | WO 99/05814 A2 | 2/1999 |
| WO | WO 99/33188 A2 | 7/1999 |
| WO | WO 99/37066 A1 | 7/1999 |
| WO | WO 00/42748 A1 | 7/2000 |
| WO | WO 01/17165 A2 | 3/2001 |
| WO | WO 01/50691 A2 | 7/2001 |
| WO | WO 01/76181 A2 | 10/2001 |
| WO | WO 02/13469 A2 | 2/2002 |
| WO | WO 02/13489 A2 | 2/2002 |
| WO | WO 02/075547 A1 | 9/2002 |
| WO | WO 02/091706 A1 | 11/2002 |
| WO | WO 2004/061703 | 7/2004 |
| WO | WO 2004081734 | 9/2004 |
| WO | WO2004088455 A2 | 10/2004 |
| WO | WO 2005116851 | 12/2005 |

OTHER PUBLICATIONS

Article entitled "An Example-Based Mapping Method for Text Categorization and Retrieval" by Yang et. al., in *ACM Transactions on Information Systems*, Jul. 1994, vol. 12, No. 3, pp. 252-277.

Article entitled "A Comparison of Two Learning Algorithms for Text Categorization" by Lewis et al., in Third Annual Symposium on *Document Analysis and Information Retrieval*, Apr. 11-13, 1994, pp. 81-92.

Article entitled "Learning Limited Dependence Bayesian Classifiers" by Sahami, in *Proceedings of the Second International Conference on Knowledge Discovery and Data Mining*, 1996, pp. 335-338.

Article entitled "An Evaluation of Phrasal and Clustered Representations on a Text Categorization Task" by Lewis, in *15th Ann Int'l SIGIR*, Jun. 1992, pp. 37-50.

Book entitled *Machine Learning* by Mitchell, 1997, pp. 180-184.

Article entitled "Learning Rules that Classify E-mail" by Cohen, pp. 1-8. Date unknown.

Article entitled "Hierarchically classifying documents using very few words" by Koller et. al., in *Proceedings of the Fourteenth International Conference on Machine Learning*, 1997.

Article entitled "Classification of Text Documents" by Li et. al., in *The Computer Journal*, vol. 41, No. 8, 1998, pp. 537-546.

Article entitled "Issues when designing filters in messaging systems" by Palme et. al., in 19 *Computer Communications*, 1996, pp. 95-101.

Article entitled "Text Categorization with Support Vector Machines: Learning with Many Relevant Features" by Joachins in *Machine Learning: ECML-98*, Apr. 1998, pp. 1-14.

Article entitled "Hierarchical Bayesian Clustering for Automatic Text Classification" by Iwayama et al. in *Natural Language*, pp. 1322-1327. Date unknown.

Article entitled "Smokey: Automatic Recognition of Hostile Messages" by Spertus in *Innovative Applications* 1997, pp. 1058-1065.

Article entitled "A Comparison of Classifiers and Document Representations for the Routing Problem" by Schutze. Date unknown.

Article entitled "CAFE: A Conceptual Model for Managing Information in Electronic Mail" by Takkinen et al. in *Proc. 31st Annual Hawaii International Conference on System Sciences*, 1998, pp. 44-53.

Article entitled "A Comparative Study on Feature Selection in Text Categorization" by Yang et. al. Date unknown.

Article entitled "Spam!" by Cranor et. al. in *Communications of the ACM*, vol. 41, No. 8, Aug. 1998, pp. 74-83.

Article entitled "Sendmail and Spam" by LeFebvre in *Performance Computing*, Aug. 1998, pp. 55-58.

Article entitled "Implementing a Generalized Tool for Network Monitoring" by Ranum et. al. in *LISA XI*, Oct. 26-31, 1997, pp. 1-8.

Article entitled "Method for Automatic Contextual Specified Transposition Upon Receipt Of Item Of Specified Criteria" printed Feb. 1994 in *IBM Technical Disclosure Bulletin*, vol. 37, No. 2B, p. 333.
Article entitled "Toward Optimal Feature Selection" by Koller et al., in *Machine Learning: Proc. of the Thirteenth International Conference*, 1996.
Website: Technical Focus—Products—Entegrity AssureAccess. www2.entegrity.com.
Website: Create Secure Internet Communication Channels—Atabok Homepage. www.atabok.com.
Website: ATABOK VCNMAIL™ Secure Email Solution—Atabok Related Produces. www.atabok.com.
Website: ATABOK VCN Auto-Exchange™—Atabok Related Produces. www.atabok.com.
Website: Controlling Digital Assets Is A Paramount Need for All Business—Atabok Related Produces. www.atabok.com.
Website: Control Your Confidential Communications with ATABOK—Atabok Related Produces. www.atabok.com.
Website: Entrust Entelligence—Entrust Homepage. www.entrust.com.
Website: E-mail Plug-in—Get Technical/Interoperability—Entrust Entelligence. www.entrust.com.
Website: E-mail Plug-in—Get Technical/System Requirements—Entrust Entelligence. www.entrust.com.
Website: E-mail Plug-in—Features and Benefits—Entrust Entelligence. www.entrust.com.
Website: Internet Filtering Software—Internet Manager Homepage. www.elronsw.com.
Website: ESKE—Email with Secure Key Exchange—ESKE. www.danu.ie.
Website: Terminet—ESKE. www.danu.ie.
Website: Baltimore Focus on e-Security—Baltimore Technologies. www.baltimore.com.
Website: Go Secure! for Microsoft Exchange—Products/Services—Verisign, Inc. www.verisign.com.
Article entitled "MIMEsweeper defuses virus network, net mail bombs" by Avery, in *Info World*, May 20, 1996, vol. 12, No. 21, p. N1.
Article entitled "Stomping out mail viruses" by Wilkerson, in *PC Week*, Jul. 15, 1996, p. N8.
Article entitled "Securing Electronic Mail Systems" by Serenelli et al., in *Communications-Fusing Command Control and Intelligence: MILCOM '92*, 1992, pp. 677-680.
Article entitled "Integralis' Minesweeper defuses E-mail bombs" by Kramer et. al., in *PC Week*, Mar. 18, 1996, p. N17-N23.
Article entitled "A Toolkit and Methods for Internet Firewalls" by Ranum et. al., in *Proc. of USENIX Summer 1994 Technical Conference*, Jun. 6-10, 1994, pp. 37-44.
Article entitled "Firewall Systems: The Next Generation" by McGhie, in *Integration Issues in Large Commercial Media Delivery Systems: Proc. of SPIE—The International Society for Optical Engineering*, Oct. 23-24, 1995, pp. 270-281.
Article entitled "Design of the TTI Prototype Trusted Mail Agent" by Rose et. al., in *Computer Message Systems-85: Proc. of the IFIP TC 6 International Symposium on Computer Message Systems*, Sep. 5-7, 1985, pp. 377-399.
Article entitled "Designing an Academic Firewall: Policy, Practice, and Experience with SURF" by Greenwald et. al., in *Proc. of the 1996 Symposium on Network and Distributed Systems Security*, 1996, pp. 1-14.
Article entitled "X Through the Firewall, and Other Application Relays" by Treese et. al. in *Proc. of the USENIX Summer 1993 Technical Conference*, Jun. 21-25, 1993, pp. 87-99.
Article entitled "Firewalls For Sale" by Bryan, in *BYTE*, Apr. 1995, pp. 99-104.
Article entitled "A DNS Filter and Switch for Packet-filtering Gateways" by Cheswick et al., in *Proc. of the Sixth Annual USENIX Security Symposium: Focusing on Applications of Cryptography*, Jul. 22-25, 1996, pp. 15-19.
Article entitled "Safe Use of X Window System Protocol Across a Firewall" by Kahn, in *Proc. of the Fifth USENIX UNIX Security Symposium*, Jun. 5-7, 1995, pp. 105-116.
Article entitled "Automating the OSI to Internet Management Conversion Through the Use of an Object-Oriented Platform" by Pavlou et al., in *Proc. of the IFIP TC6/WG6.4 International Conference on Advanced Information Processing Techniques for LAN and MAN Management*, Apr. 7-9, 1993, pp. 245-260.
Article entitled "A Secure Email Gateway (Building an RCAS External Interface)" by Smith, in *Tenth Annual Computer Security Applications Conference*, Dec. 5-9, 1994, pp. 202-211.
Article entitled "Secure External References in Multimedia Email Messages" by Wiegel, in *3rd ACM Conference on Computer and Communications Security*, Mar. 14-16, 1996, pp. 11-18.
Memo entitled "SOCKS Protocol Version 5" by Leech et. al., in *Standards Track*, Mar. 1996, pp. 1-9.
Article entitled "Securing the Web: firewalls, proxy servers, and data driven attacks" by Farrow in *InfoWorld*, Jun. 19, 1995, vol. 17, No. 25, p. 103.
Office Action in JP App. Ser. No. 2007-540073, dated Dec. 16, 2010, and translation, 9 pages.

\* cited by examiner

FIG. 9

| $P_R$ \ $P_{NR}$ | 0.0 | 0.1 | 0.2 | 0.3 | 0.4 | 0.5 | 0.6 | 0.7 | 0.8 | 0.9 | 1.0 |
|---|---|---|---|---|---|---|---|---|---|---|---|
| 0.0 | 0 | 3 | 5 | 6 | 5 | 4 | 4 | 10 | 27 | 65 | 140 |
| 0.1 | -3 | 0 | 2 | 3 | 3 | 3 | 5 | 12 | 28 | 62 | 126 |
| 0.2 | -5 | -2 | 0 | 1 | 2 | 3 | 5 | 11 | 24 | 53 | 106 |
| 0.3 | -6 | -3 | -1 | 0 | 1 | 2 | 4 | 9 | 20 | 43 | 85 |
| 0.4 | -5 | -3 | -2 | -1 | 0 | 1 | 3 | 7 | 16 | 33 | 66 |
| 0.5 | -4 | -3 | -3 | -2 | -1 | 0 | 2 | 5 | 12 | 25 | 50 |
| 0.6 | -4 | -5 | -5 | -4 | -3 | -2 | 0 | 3 | 8 | 18 | 37 |
| 0.7 | -10 | -12 | -11 | -9 | -7 | -5 | -3 | 0 | 5 | 13 | 27 |
| 0.8 | -27 | -28 | -24 | -20 | -16 | -12 | -8 | -5 | 0 | 7 | 18 |
| 0.9 | -65 | -62 | -53 | -43 | -33 | -25 | -18 | -13 | -7 | 0 | 10 |
| 1.0 | -140 | -126 | -106 | -85 | -66 | -50 | -37 | -27 | -18 | -10 | 0 |

Rows: $P_R$ (Probability of Reputable Sender). Columns: $P_{NR}$ (Probability of Non-Reputable Sender).

MESSAGE PROFILING SYSTEMS AND METHODS

CROSS-REFERENCE TO RELATED APPLICATIONS

This application is a continuation-in-part of, and claims priority to and the benefit of, U.S. patent application Ser. No. 11/142,943 (entitled "SYSTEMS AND METHODS FOR CLASSIFICATION OF MESSAGING ENTITIES" filed Jun. 2, 2005 which claims priority to and the benefit of U.S. Provisional Application Ser. No. 60/625,507 (entitled "Classification of Messaging Entities") filed on Nov. 5, 2004, which applications' disclosures are incorporated herein by reference.

This application is a continuation-in-part of, and claims priority to and the benefit of, commonly assigned U.S. patent application Ser. No. 10/093,553, entitled "SYSTEMS AND METHODS FOR ADAPTIVE MESSAGE INTERROGATION THROUGH MULTIPLE QUEUES," U.S. patent application Ser. No. 10/094,211, entitled "SYSTEMS AND METHODS FOR ENHANCING ELECTRONIC COMMUNICATION SECURITY," and U.S. patent application Ser. No. 10/094,266, entitled "SYSTEMS AND METHODS FOR ANOMALY DETECTION IN PATTERNS OF MONITORED COMMUNICATIONS," all filed on Mar. 8, 2002, each of which are hereby incorporated by reference in their entirety. This application is also a continuation-in-part of, and claims priority to and the benefit of, commonly assigned U.S. patent application Ser. No. 10/361,091, filed Feb. 7, 2003, entitled "SYSTEMS AND METHODS FOR MESSAGE THREAT MANAGEMENT," U.S. patent application Ser. No. 10/373,325, filed Feb. 24, 2003, entitled "SYSTEMS AND METHODS FOR UPSTREAM THREAT PUSH-BACK," U.S. patent application Ser. No. 10/361,067, filed Feb. 7, 2003, entitled "SYSTEMS AND METHODS FOR AUTOMATED WHITELISTING IN MONITORED COMMUNICATIONS," and U.S. patent application Ser. No. 10/384,924, filed Mar. 6, 2003, entitled "SYSTEMS AND METHODS FOR SECURE COMMUNICATION DELIVERY." The entire disclosure of all of these applications is incorporated herein by reference.

BACKGROUND AND SUMMARY

This document relates generally to systems and methods for processing communications and more particularly to systems and methods for filtering communications.

In the anti-spam industry, spammers use various creative means for evading detection by spam filters. Available anti-spam systems include fail-open systems in which all incoming messages are filtered for spam. However, these systems can be inefficient and inaccurate in Properly classifying messages as legitimate or spam.

In accordance with the teachings disclosed herein, methods and systems are provided for operation upon one or more data processors that classify communications from messaging entities. For example, a method and system can include receiving a communication that was sent from a messaging entity. A plurality of message classification techniques is used to classify the communication. A message classification technique is associated with a confidence value which is used in generating a message classification output from the message classification technique. The message classification outputs are combined in order to generate a message profile score. The message profile score is used in deciding what action is to be taken with respect to the communication associated with the messaging entity.

As another example, a system and method can utilize a plurality of message classification techniques, wherein the plurality of message classification techniques are configured to classify a communication received from a messaging entity. Message profiling logic can be configured to combine the message classification outputs in order to generate a message profile score. The message profile score is used in deciding what action is to be taken with respect to the communication associated with the messaging entity.

As another example, a system and method can be used for tuning message classification parameters for use by one or more message classification techniques. A plurality of input data is received (such as through input logic or processing instructions) that is or is representative of a plurality of communications. A tuner program is used to tune the message classification parameters associated with the message classification techniques. A communication is received from a messaging entity. The tuned message classification parameters are used by the plurality of message classification techniques to classify the communication. Message classification outputs from the plurality of message classification techniques are combined in order to generate a message profile score. The message profile score is used in deciding what action is to be taken with respect to the communication associated with the messaging entity.

BRIEF DESCRIPTION OF THE DRAWINGS

FIG. 9 is a table depicting reputation scores at various calculated probability values.

DETAILED DESCRIPTION

Figure 1:
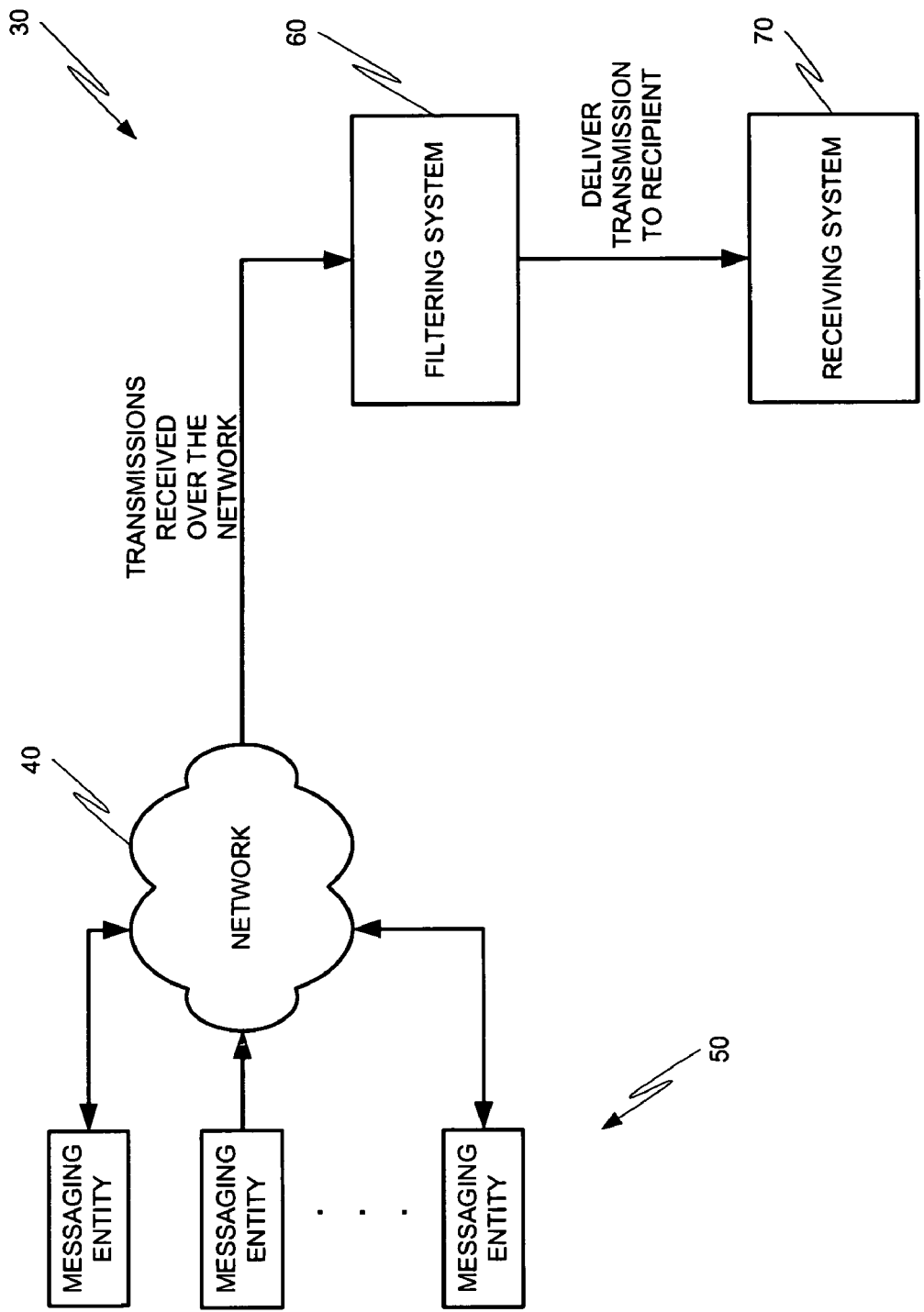
FIG. 1 is a block diagram depicting a system for handling transmissions received over a network.

FIG. 1 depicts at 30 a system for handling transmissions received over a network 40. The transmissions can be many different types of communications, such as electronic mail (e-mail) messages sent from one or more messaging entities 50. The system 30 uses a filtering system 60 to help process the communications from the messaging entities 50. The filtering system 60 examines characteristics associated with the communications from the messaging entities 50, and based upon the examination, an action is taken with respect to the communications. For example, a communication may be determined to be legitimate and thus the communication should not be filtered by the filtering system 60 and instead provided to a receiving system 70 for delivery to the intended recipient.

Figure 2:
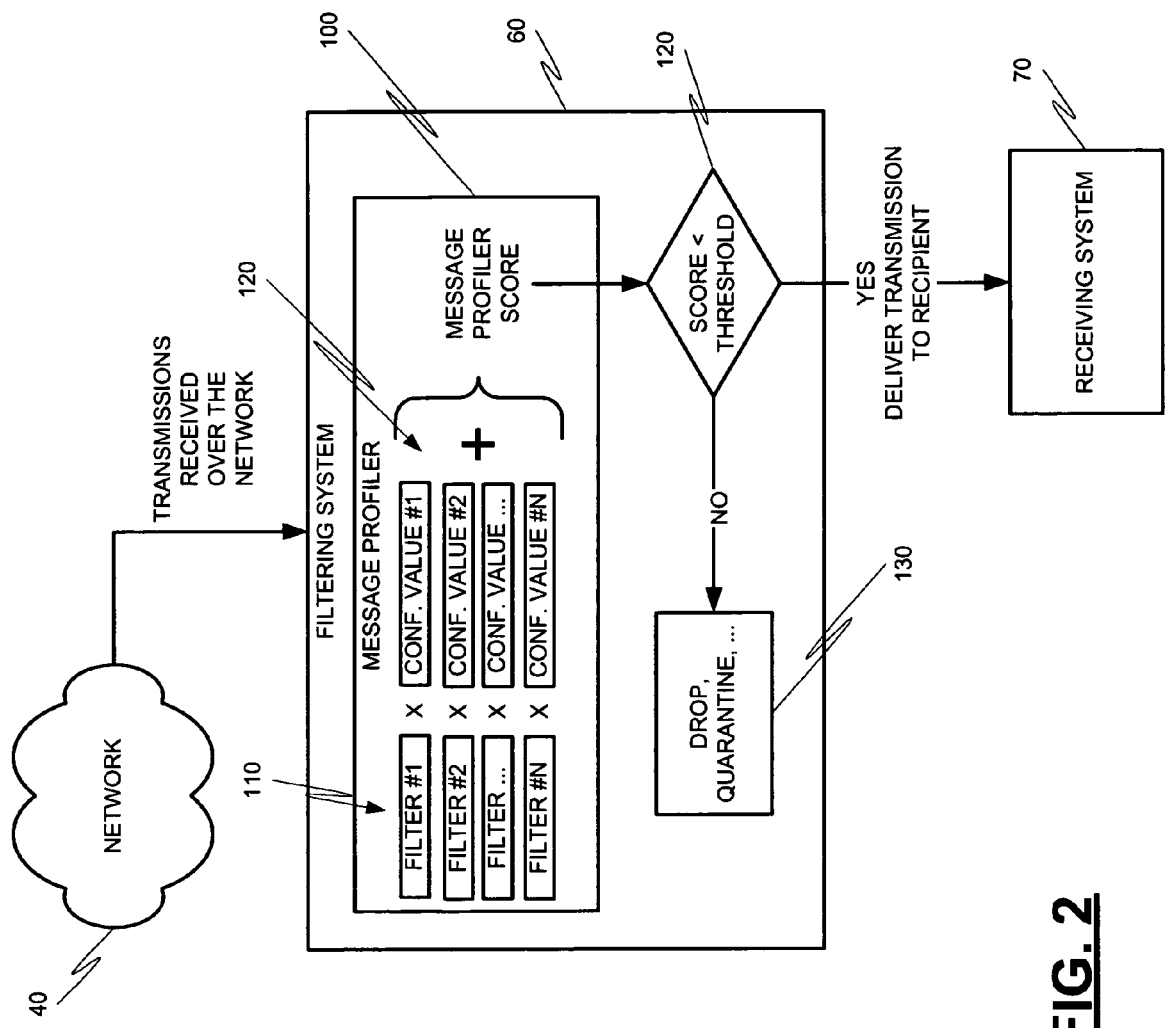
FIG. 2 is a block diagram depicting a filtering system having a message profiler program.

To increase the accuracy of classifying messages properly (e.g., as spam or legitimate), a filtering system 60 can be configured with a message profiler program 100 as shown in FIG. 2. A message profiler 100 uses multiple message classification techniques or filters 110 to classify messages as shown in FIG. 2. Example message classification techniques or filters 110 that a message profiler 100 can use include:

- Reverse DNS (RDNS)—a classification technique that performs a reverse domain name service (DNS) lookup, based on the message sender's IP address, to check (1) whether a domain exists in the DNS system for that IP address, and (2) if such a domain exists, whether the domain matches the domain from which the sender claims to be sending the message.
- Real-time Black-hole Lists (RBLs)—a classification technique that performs one or more real-time black-hole list (RBL) queries, based on the message sender's IP address, to check whether the IP address has been identified by any RBLs as an IP address that is likely to send unwanted messages.
- Reputation Server—a classification technique that performs one or more reputation server queries, based on the message sender's IP address and/or their domain name and other message sender characteristics, to receive a score that describes the sender's reputation.
- Signature/fingerprinting-based Analysis (e.g., Statistical Lookup Service (SLS))—a classification technique that computes a set of message hashes and queries a centralized statistical lookup service (SLS) to determine how frequently the computed message hashes have been seen in recent mail flow.
- Message Header Analysis Classification Technique—as examples, this technique can include System Defined Header analysis (SDHA), User Defined Header Analysis (UDHA), etc.
- System Defined Header Analysis (SDHA)—a set of classification techniques that examine a message and identify whether the message's headers exhibit certain system-defined characteristics that tend to identify likely unwanted message senders.
- User Defined Header Analysis (UDHA)—a set of classification techniques that examine a message and identify whether the message's headers exhibit certain user-defined characteristics that tend to identify likely unwanted message senders.
- Sender Authentication—a set of classification techniques that perform lookups to determine (1) whether the sender's claimed domain has published a record of mail servers that are authorized to send mail for that domain, and (2) if such a record has been published, whether the record authorizes the sender's IP address to send mail on behalf of the claimed domain. Examples of commonly used Sender Authentication techniques include Sender Policy Framework (SPF) and Sender ID.
- Bayesian Filtering—a statistical classification technique that computes an estimate of the joint conditional probability that a message falls into a specific category, based on the set of textual tokens (words) in the message.
- Content Filtering—a classification technique that searches the contents of a message for words that have been associated with certain message categories.
- Clustering Classification—a classification technique that based upon measuring similarity among features, communications are clustered into such groups as desired, undesired (e.g., spam), etc. The clustering is performed such that intra-group similarities are high and inter-group similarities are low.

The list is not intended to be exhaustive, and can be adapted to include other techniques as they are discovered. Some of the descriptions in the list constitute a single technique, while others constitute a combined set of many similar or closely related techniques. In cases where multiple techniques are described collectively, the message profiler 100 permits each technique to have its own confidence value.

A message profiler 100 classifies messages using a threshold-based technique. Each of the classification techniques 110 used by the message profiler 100 has an associated confidence value 120. When a message arrives for profiling, the message profiler 100 iterates through the classification techniques and allows each technique to attempt to classify the message. The result of each classification is a decimal value in the range [0,1]. After iterating through each classification technique, the message profiler 100 computes a score for the message using the following formula:

$$\text{Score} = \sum_{i=1}^{N} SV_i \times C_i$$

where $SV_i$ is the confidence value associated with classification technique i, and $C_i$ is the classification value in [0,1] produced by classification technique i.

In using classification techniques with non-linear scoring functions, the following formula can be used:

$$\text{Score} = \sum_{i=1}^{N} (SV_{1i} \times C_i + SV_{2i} \times C_i^2)$$

where $SV_{1i}$ and $SV_{2i}$ are the confidence value associated with classification technique i, and $C_i$ is the classification value in [0,1] produced by classification technique i.

If the message score exceeds some specified threshold T as determined at 120, then the message is declared to belong to the first defined category. If the message score is below the threshold, it is declared to belong to the opposite category. The system can then take an appropriate action based on the threshold reached by the message score, such as quarantining the message, dropping the message (i.e., deleting the message without delivery as shown at 130), rewriting the subject of the message to contain some specific string (e.g., "SUSPECTED SPAM"), passing on a message to the encryption engine for secure delivery, etc. The system can also allow for specifying multiple thresholds and applying a different action or actions at each threshold, which would signify the increased confidence of the message profiler 100 in the result of the classification.

The effectiveness and accuracy of a message profiler 100 is dependent on several factors, such as on the set of $SV_i$ or $SV_{1i}/SV_{2i}$ confidence values 120 associated with the classification techniques 110. A tunable message classification configuration can be used to generate an optimized set of values along with an associated set of thresholds and actions and that can be generated periodically to keep a message profiler 100 updated with the latest protection against the frequent changes in the score distributions of classification techniques operating on the constantly changing message flow patterns. As such, a message profiler configuration includes a vector $(SV_1, SV_2, \ldots, SV_N)$ (which represents the confidence values of all N classification techniques).

Figure 3:
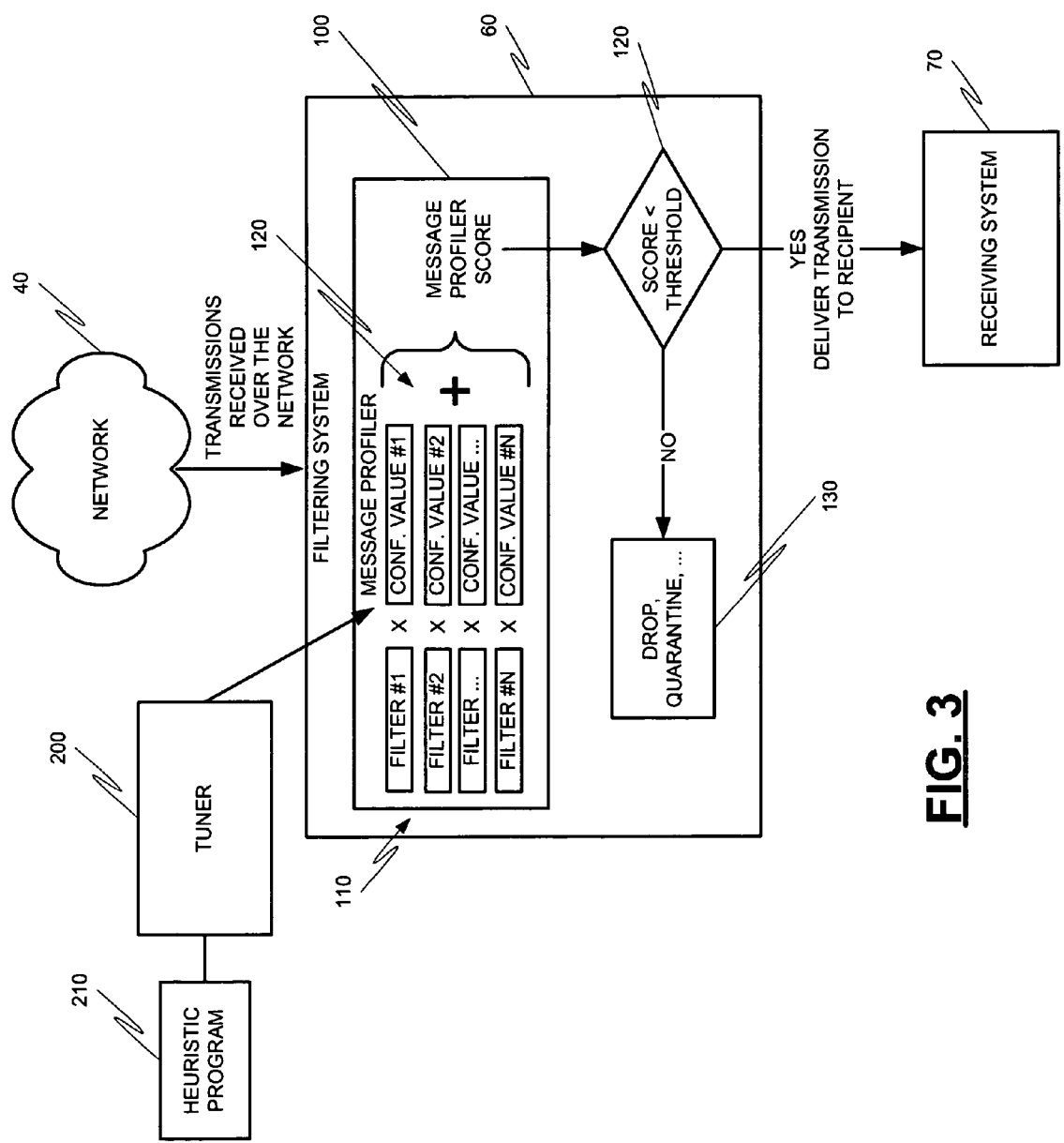
FIG. 3 is a block diagram depicting a message classification tuner program.

As shown in FIG. 3, a message classification tuner program 200 can be configured to tune a message profiler 100 by performing a probabilistic search through the vector space of all possible vectors and identifying a vector that maximizes the filtering accuracy of the profiler for a pre-selected threshold. The tuner 200 can use different approaches to do this, such as by using a heuristic approach 210.

Figure 4:
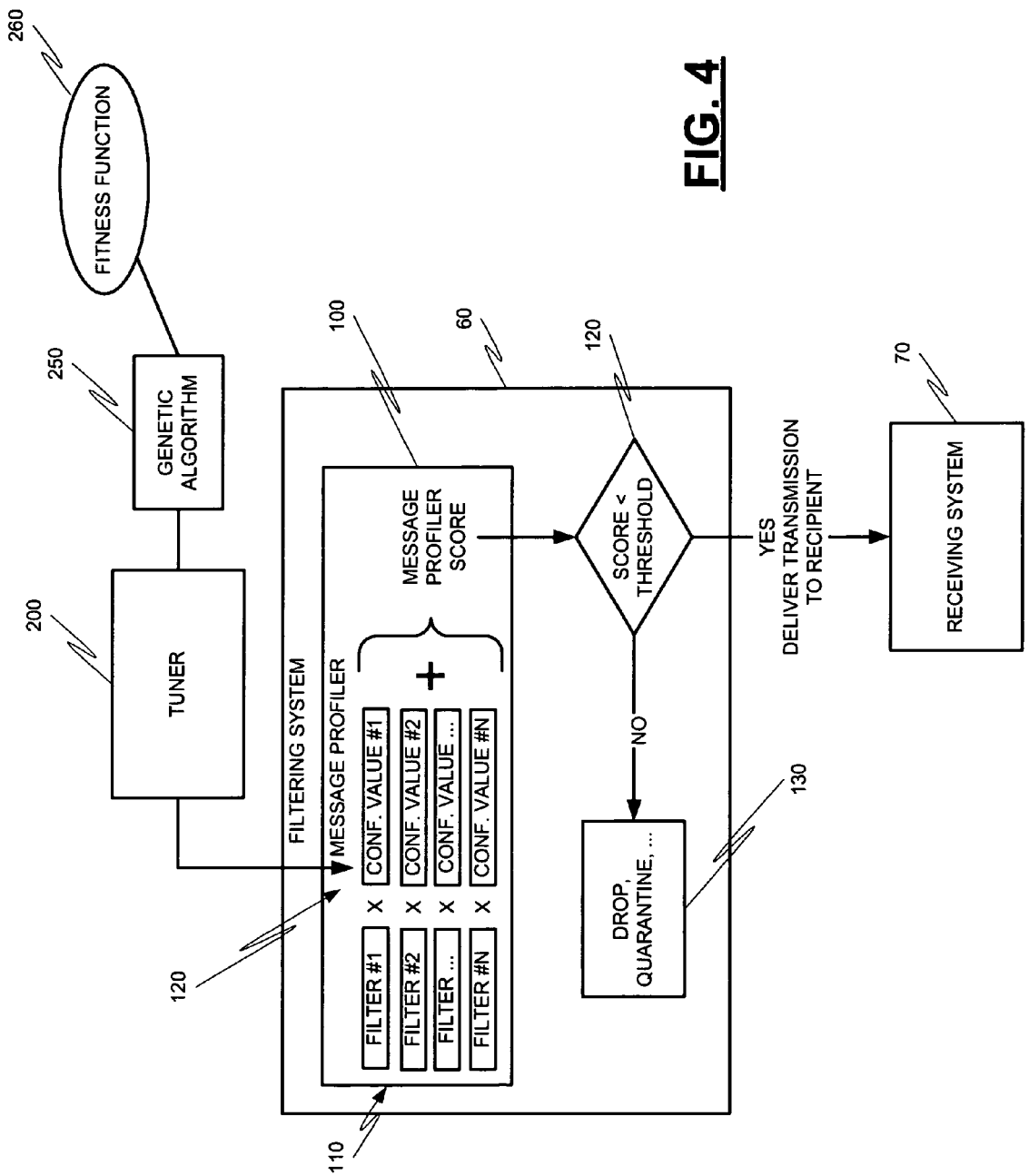
FIG. 4 is a block diagram depicting use of a genetic algorithm as a message classification tuner program.

FIG. 4 illustrates the tuner using a heuristic approach known as a genetic algorithm 250 in order to perform a vector space search. The concepts underpinning a genetic algorithm come from the theory of evolution, in which genotypes (expressed via chromosomes) compete with each other via their phenotypes (expressed as biological organisms). Over time, biological evolution produces highly adapted and complex organisms that are capable of surviving in the environment for which they evolved. Similarly, a genetic algorithm searches through a vector space consisting of candidate solutions to a problem, where each candidate solution is expressed as a vector. Over many simulated generations of candidate solutions, the genetic algorithm gradually evolves towards increasingly well-adapted solutions to the problem.

The genetic algorithm's ability to evolve good solutions to a problem over time depends upon the existence of an accurate mechanism for evaluating the relative fitness level of a candidate solution compared to other candidate solutions. Thus, the genetic algorithm 250 is designed with a fitness function 260 that accurately models the fitness of candidate solutions in the actual problem domain.

Below is a fitness function 260 that could be used for optimization of a message profiler 100:

$$\text{Fitness} = \frac{\sum |S_{CAT1\_MISTAKES_i} - T|}{N_{CAT1}} + C \times \frac{\sum |S_{CAT2\_MIKSTAKES_j} - T + 1|}{N_{CAT2}}$$

The definitions of terms in the function are as follows:
$N_{CAT1}$=number of message vectors from the overall data set that belong to the first category
$N_{CAT2}$=number of message vectors from the overall data set that belong to the second category
C=constant multiplier for misclassified messages from the second category
$S_{CAT1\_MIKSTAKEi}$=message profiler score of message vector i from the first message category that has been misclassified to belong in the other category
$S_{CAT2\_MISTAKEi}$=message profiler score of message vector i from the second message category that has been misclassified to belong in the other category
T=message profiler numeric threshold above which a message is considered to belong to the first category The function expresses the cost associated with the mistakes that a configuration made in attempting to correctly classify message vectors in the set of pre-classified data. Accordingly, a lower fitness value is considered better for the genetic algorithm's purposes. The first term in the function expresses the cost associated with messages from the first category that have been misclassified to belong in the second (e.g., unwanted messages that have been classified as legitimate, also known as false negatives), and the second term expresses the cost associated with messages from the second category that have been misclassified to belong in the first (e.g., legitimate messages that have been classified as unwanted, also known as false positives). The summations represent the total number of points by which a configuration was wrong when attempting to classify message vectors. Intuitively, each term is essentially an expression of both the average frequency of classification errors and the average magnitude of classification errors. Note that the second term is to be multiplied by a constant, C. This constant (which can be set to a value of 20) represents the relative cost of a misclassification of a message from one category in relation to misclassification of a message from the opposing category. By setting C to 20, this indicates that classification mistakes on messages from the second category are 20 times more costly than mistakes from the second category. For example, if a message profiler 100 is used for classification of wanted and unwanted mail, the first category would represent the unwanted mail (e.g., spam) and the second category would represent legitimate messages. Then the above function would deem misclassifications of legitimate messages (false positives) to be 20 times as costly as misclassification of unwanted messages (false negatives). This reflects the real-world view in the anti-spam community that false positives carry much higher risk than false negatives. If a message profiler 100 is used for policy compliance-related classification, a false positive is a message that contains sensitive information but is not labeled as such by the message profiler 100 and is, therefore, allowed to evade the policies that an organization may have chosen to apply to that particular category.

Figure 5:
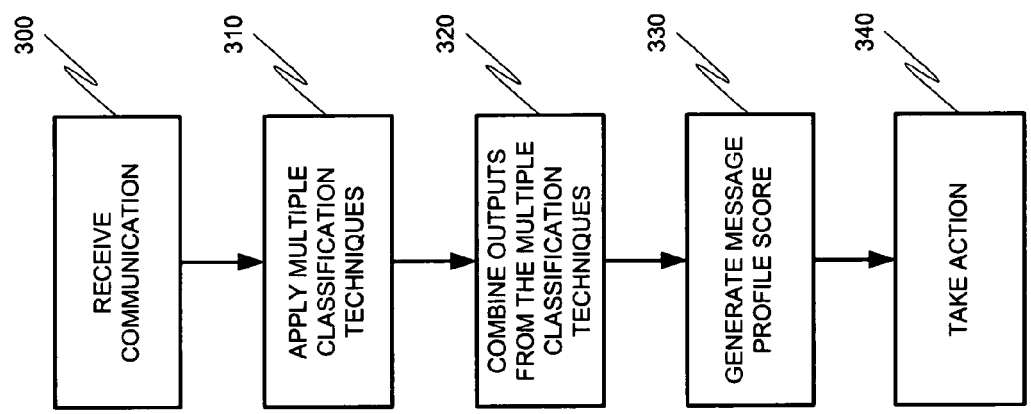
FIG. 5 is a flowchart depicting an operational scenario wherein a message profiler is used.

FIG. 5 depicts an operational scenario wherein a message profiler can be used. With reference to FIG. 5, the operational scenario includes receiving at step 310 a communication that was sent over a network from a messaging entity. A plurality of message classification techniques is then used at 310 to classify the communication. Each message classification technique is associated with a confidence value which is used in generating a message classification output from the message classification technique. The output of each classification can be numeric values, textual values, or categorical values. The message classification outputs are combined at step 320 in order to generate a message profile score at step 330. The message profile score is used at step 340 to decide what action is to be taken with respect to the communication associated with the messaging entity.

It should be understood that similar to the other processing flows described herein, the processing and the order of the processing may be altered, modified and/or augmented and still achieve the desired outcome. For example, a message profiler may be configured for an operational scenario that recognizes that there is a single technique is not capable of adequately classifying a message into two distinct categories, such as distinguishing between wanted (legitimate) and unwanted (spam, phishing, viruses, etc) message communications or determining whether a message complies with a specific organization policy, law, or regulation. In this operational scenario, such a configured message profiler can be designed to:
1. Provide a framework for combining the results of many message classification techniques into an aggregate classification (such as "unwanted" or "legitimate", "HIPPA compliant", "GLBA violation", "HR policy violation", etc), without specifying a priori which classification technique(s) will be used.
2. Decouple each classification technique's importance (expressed via its contribution towards the aggregate classification) from its classification logic, so that a technique's level of importance may be adjusted to reflect changes in its accuracy over time.

3. Provide a mechanism through which to describe the relative importance of each classification technique within the framework and the correlation of their individual accuracy, so that the framework can be adjusted to use this information to achieve very accurate rates in aggregate classification.
4. Provide a mechanism through which to discover the relative importance of each classification technique within the framework, so that the framework can be "tuned" for maximum classification accuracy in a given environment.

Figure 6:
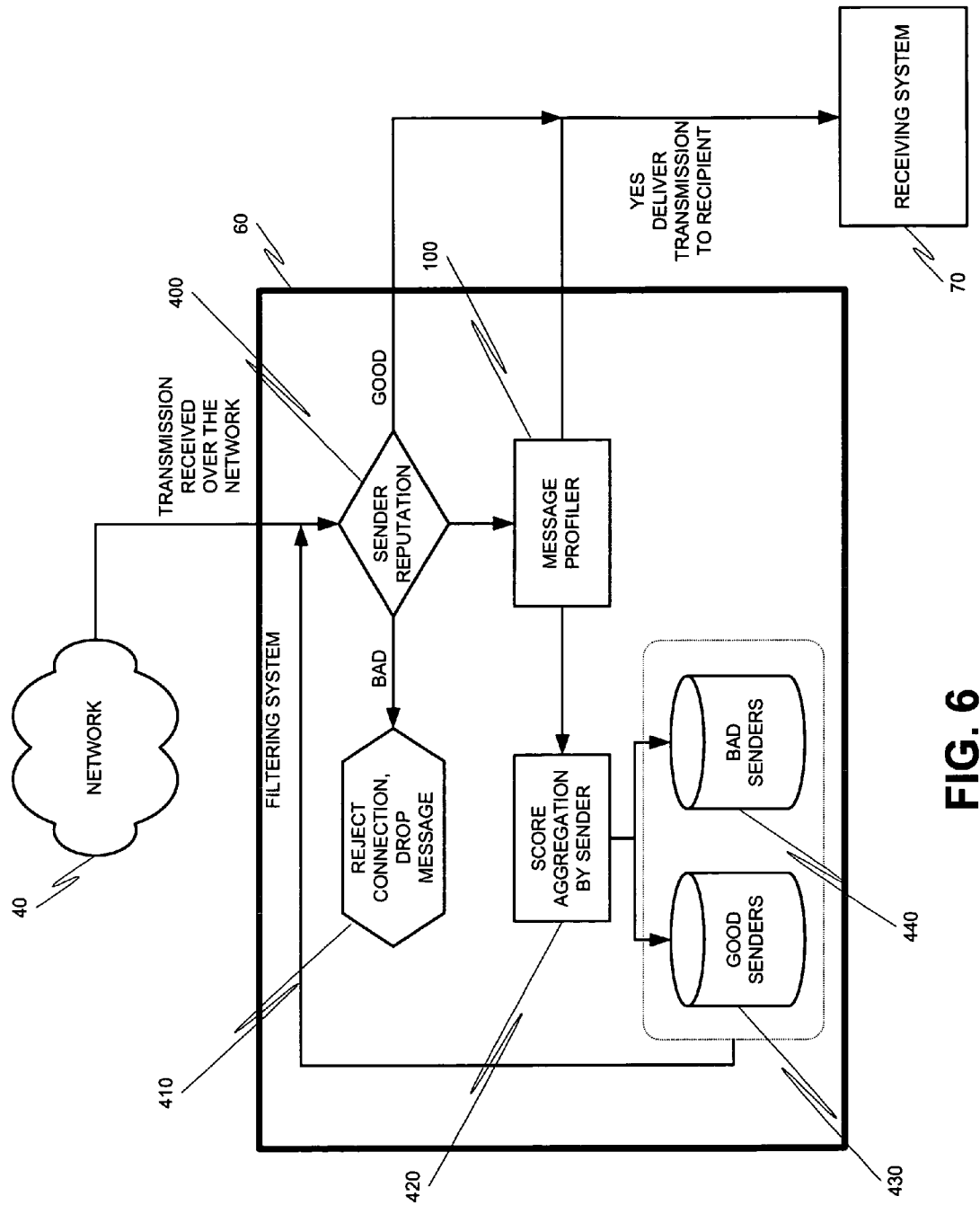
FIG. 6 is a block diagram depicting a message profiler that has been adapted to operate with an adaptive message blocking and whitelisting.

Still further, a message profiler may be configured to operate in other operational scenarios. For example, FIG. 6 depicts a message profiler that has been adapted to operate with adaptive message blocking and whitelisting. With reference to FIG. 6, in addition to classification of individual messages, the aggregated results of a message profiler program 100 can also be used for classifying at 420 senders of messages based on the distributions of message profiler scores that their messages are receiving. If the average score of messages received from a particular sender (e.g., IP) during a specified timeframe (e.g., hour, day, week) exceeds a specified threshold $T_U$, and the score distribution has a standard deviation smaller than $ST_U$, that sender can be classified 'un-reputable' (which information is stored in data store 440). Process 400 can then use the data from data store 440 to determine that all messages and connections originating from such a sender can be dropped at 410 without processing for the next X hours. Correspondingly, if the average score is below threshold TL with a standard deviation smaller than STL, the sender can be considered legitimate (which information is stored in data store 430) and messages from that sender can be allowed by process 400 to bypass certain filtering techniques (e.g., the filtering of message profiler 100) that can cause significant processing, network, or storage overhead for the filtering system 60.

A message profiler may also be used in connection with adaptive training of endo and exo-filtering systems. Using the systems and methods of sender classifier described herein, a message profiler can be used for training of the various filtering techniques that are used within the profile, as well as others that lie completely outside of it. Such techniques may include Bayesian, Support Vector Machine (SVM) and other statistical content filtering techniques, as well as signature-based techniques such as Statistical Lookup Service (SLS) and message clustering-type techniques. The training strategies for such techniques may use sets of classified legitimate and unwanted messages, which can be provided by the message profiler based on sender reputations, assigned from the aggregate scores of messages from such senders. Messages from senders classified as un-reputable can be provided to the filtering system trainer as unwanted, and the wanted messages will be taken from stream sent by the legitimate senders.

Figure 7:
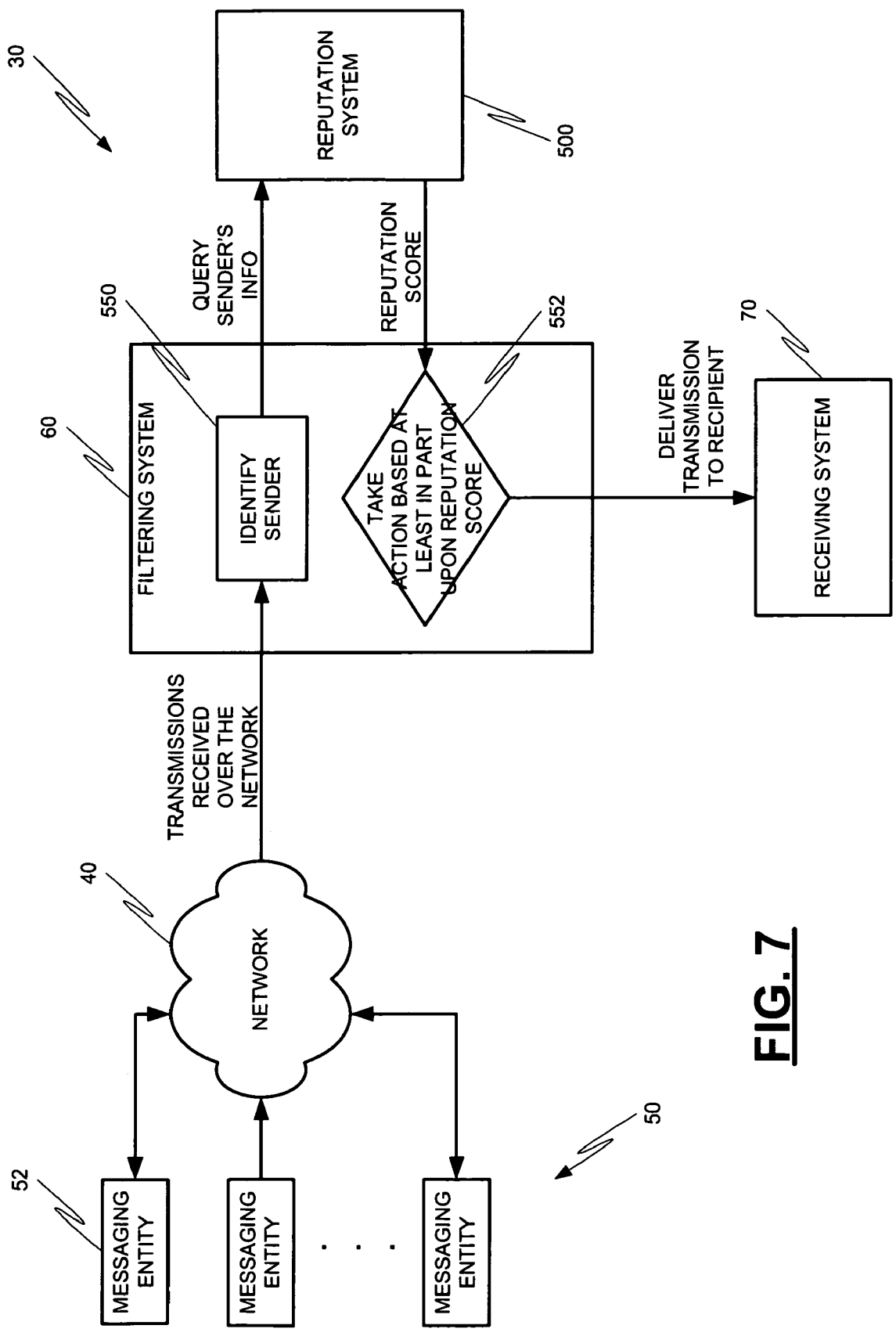
FIG. 7 is a block diagram depicting a reputation system for handling transmissions received over a network.

As described above, a message profiler 100 may use a reputation-based approach as one classification technique. FIG. 7 depicts at 500 a reputation system that can be used by a filtering system 60 in handling transmissions received over a network 40 from messaging entities 50. More specifically, the filtering system 60 uses the reputation system 500 to help determine (at least in part) what filtering action (if any) should be taken upon the messaging entities' communications. For example, the communication may be determined to be from a reputable source and thus the communication should not be filtered.

The filtering system 60 identifies at 550 the sender of a received communication and provides that identification information to the reputation system 500. The reputation system 500 evaluates the reputation of the queried sender's identity by calculating probabilities that a messaging entity exhibits certain characteristics. An overall reputation score is determined based upon the calculated probabilities and is provided to the filtering system 60. A reputation score can be numeric, textual, or categorical in value.

The filtering system 60 determines at 552 what action should be taken for the sender's communication. The filtering system 60 could use the reputation score from the reputation system 500 as a message classification filter which is to be multiplied by its respectively tuned confidence value and then aggregated with other message classification filter results.

Figure 8:
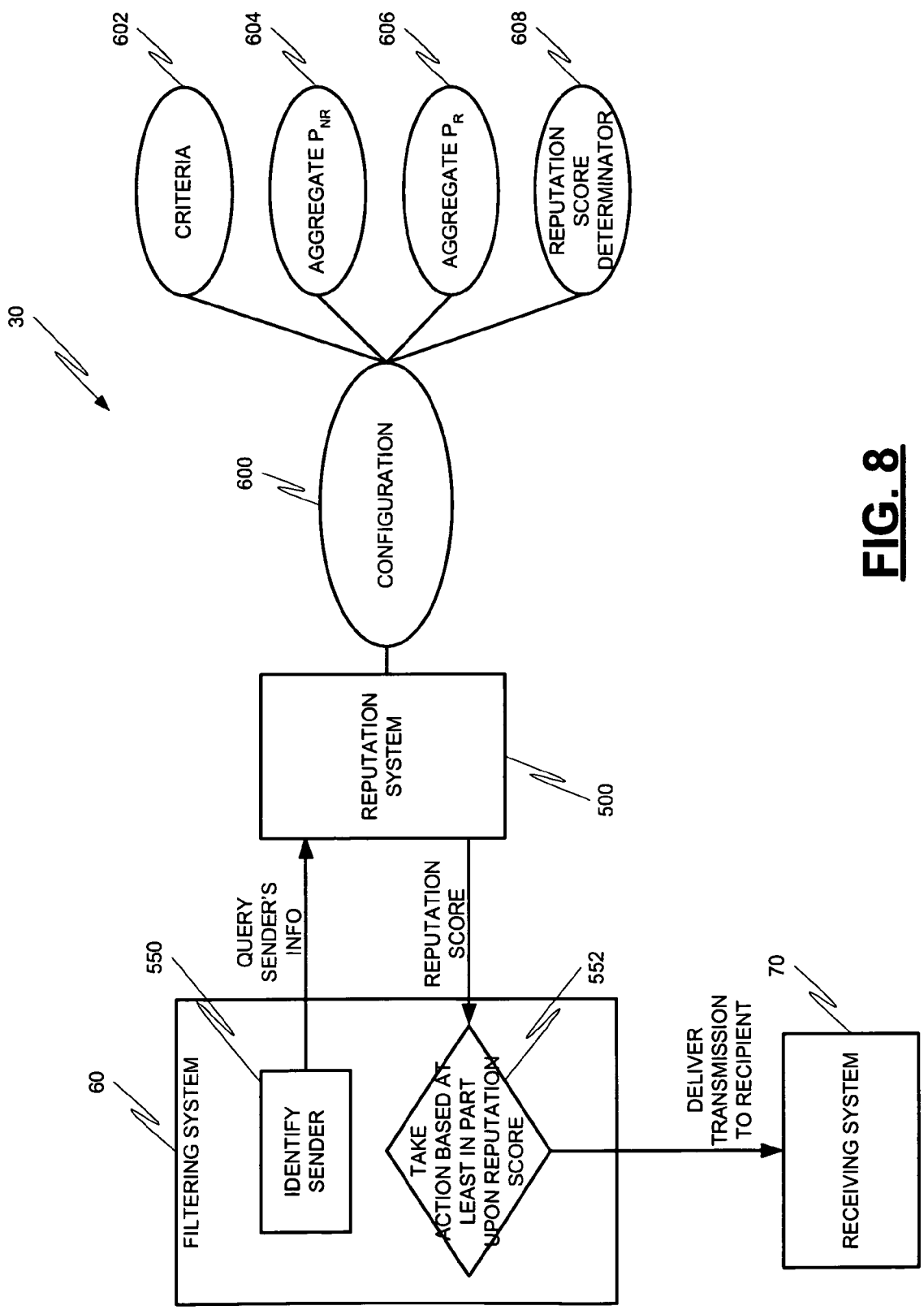
FIG. 8 is a block diagram depicting a reputation system that has been configured for determining reputation scores.

Reputation systems may be configured in many different ways in order to assist a filtering system. For example, FIG. 8 depicts the reputation system 500 that has been configured to calculate reputation scores. The system's configuration 600 can be established by identifying a set of binary, testable criteria 602 which appear to be strong discriminators between good and bad senders. $P(NR|C_i)$ can be defined as the probability that a sender is non-reputable, given that it conforms to quality/criterion $C_i$, and $P(R|C_i)$ can be defined as the probability that a sender is reputable, given that it conforms to quality/criterion $C_i$.

For each quality/criterion $C_i$, periodic (e.g., daily, weekly, monthly, etc.) sampling exercises can be performed to recalculate $P(NR|C_i)$. A sampling exercise may include selecting a random sample set S of N senders for which quality/criterion $C_i$ is known to be true. The senders in the sample are then sorted into one of the following sets: reputable (R), non-reputable (NR) or unknown (U). $N_R$ is the number of senders in the sample that are reputable senders, $N_{NR}$ is the number of senders that are non-reputable senders, etc. Then, $P(NR|C_i)$ and $P(R|C_i)$ are estimated using the formulas:

$$P(NR \mid C_i) = \frac{N_{NR}}{N}$$

$$P(R \mid C_i) = \frac{N_R}{N}$$

For this purpose, N=30 was determined to be a large enough sample size to achieve an accurate estimate of $P(NR|C_i)$ and $P(R|C_i)$ for each quality/criterion $C_i$.

After calculating $P(NR|C_i)$ and $P(R|C_i)$ for all criteria, the computed probabilities are used to calculate an aggregate non-reputable probability 604, $P_{NR}$, and an aggregate reputable sender probability 606, $P_R$, for each sender in the reputation space. These probabilities can be calculated using the formulas:

$$P_{NR} = \left(1 - \prod_{i=1}^{N} \begin{cases} 1 - P(NR \mid C_i) & \text{if criterion } i \text{ applies} \\ 1 & \text{otherwise} \end{cases}\right)^{(\# \text{ of criteria that apply})}$$

$$P_R = \left(1 - \prod_{i=1}^{N} \begin{cases} 1 - P(R \mid C_i) & \text{if criterion } i \text{ applies} \\ 1 & \text{otherwise} \end{cases}\right)^{(\# \text{ of criteria that apply})}$$

In experimentation, the above formulas appeared to behave very well for a wide range of input criteria combinations, and in practice their behavior appears to be similar to the behavior of the formula for correctly computing naïve joint conditional probabilities of "non-reputable" and "reputable" behavior for the input criteria.

After calculating $P_{NR}$ and $P_R$ for each sender, a reputation score is calculated for that sender using the following reputation function:

$$f(P_{NR}, P_R) = (c_1 + c_2 P_{NR} + c_2 P_R + c_3 P_{NR}^2 + c_3 P_R^2 + c_4 P_{NR} P_R + c_5 P_{NR}^3 + c_5 P_R^3 + c_6 P_{NR} P_R^2 + c_6 P_{NR}^2 P_R)$$
$$((P_{NR} - P_R)^3 + c_7 (P_{NR} - P_R))$$

where $c_1 = 86.50$ $c_2 = -193.45$ $c_3 = -35.19$ $c_4 = 581.09$ $c_5 = 234.81$ $c_6 = -233.18$ $c_7 = 0.51$ It should be understood that different functions can act as a reputation score determinator 608 and can be expressed in many different forms in addition to a functional expression. As an illustration, FIG. 9 depicts at 700 a tabular form for determining reputation scores. The table shows reputation scores produced by the above function, based on values of $P_{NR}$ and $P_R$ as they each vary between 0.0 and 1.0. For example as shown at 710, a reputation score of 53 is obtained for the combination of $P_{NR}=0.9$ and $P_R=0.2$. This reputation score is a relatively high indicator that the sender should not be considered reputable. A reputation score of 0 is obtained if $P_{NR}$ and $P_R$ are the same (e.g., the reputation score is 0 if $P_{NR}=0.7$ and $P_R=0.7$ as shown at 720). A reputation score can have a negative value to indicate that a sender is relatively reputable as determined when $P_R$ is greater than $P_{NR}$. For example, if $P_{NR}=0.5$ and $P_R=0.8$ as shown at 730, then the reputation score is $-12$.

Many different types of criteria may be used in a reputation system's processing of a sender's communication, such as using non-reputable criteria and reputable criteria to determine reputation scores. Examples of such criteria are disclosed in U.S. Provisional Application Ser. No. 60/625,507, entitled "CLASSIFICATION OF MESSAGING ENTITIES," filed on Nov. 5, 2004.

The systems and methods disclosed herein are presented only by way of example and are not meant to limit the scope of the invention. Other variations of the systems and methods described above will be apparent to those skilled in the art and as such are considered to be within the scope of the invention. For example, a system and method can be configured to handle many different types of communications, such as legitimate messages or unwanted communications or communications violative of a pre-selected policy. As an illustration, an unwanted communication could include a spam or virus communication, and a pre-selected policy could include a corporate communication policy, a messaging policy, a legislation or regulatory policy, or an international communication policy.

Figure 10:
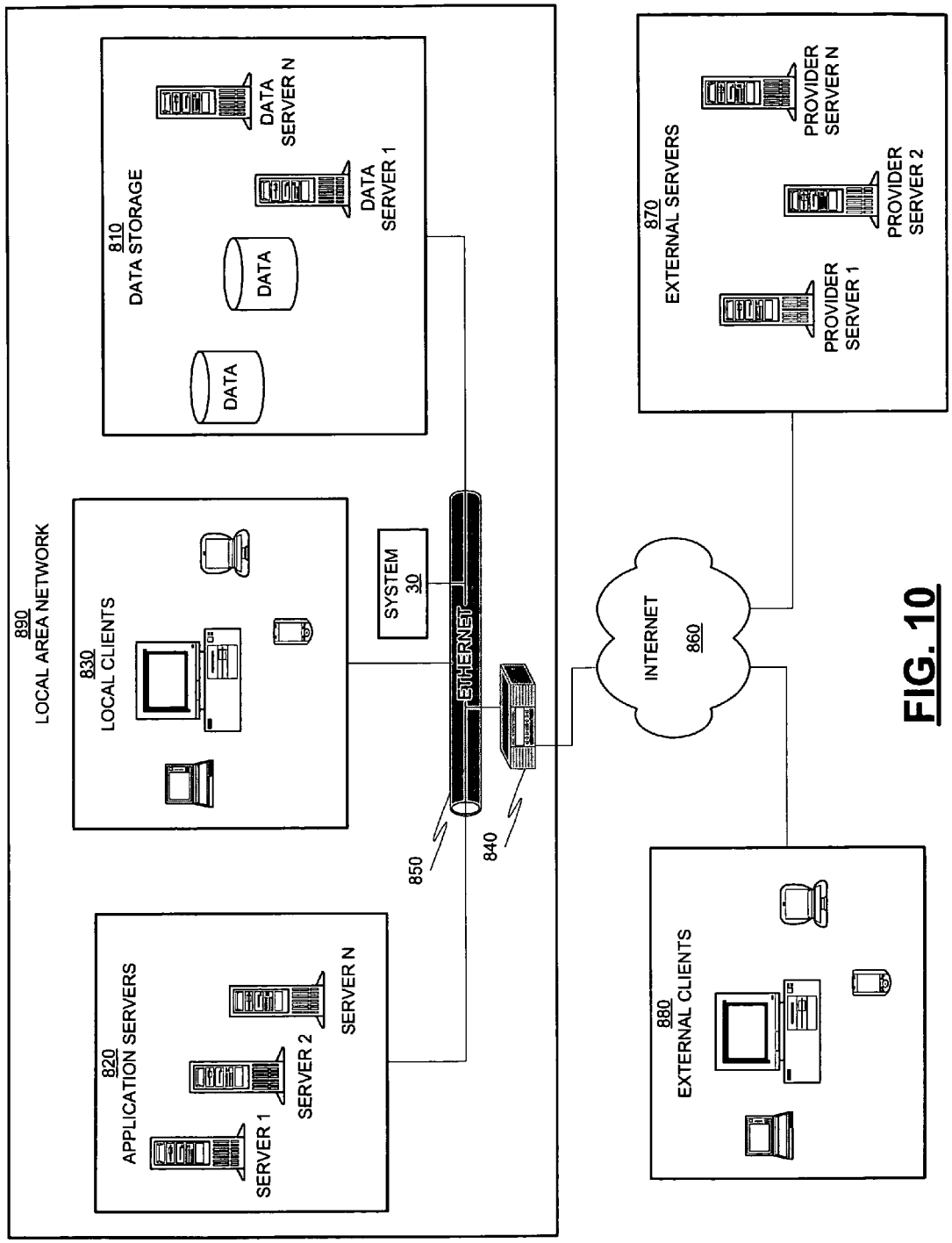
FIG. 10 is a block diagram depicting a server access architecture.

As another example of the wide scope and variations of the systems and methods disclosed herein, the systems and methods may be implemented on various types of computer architectures, such as for example on different types of networked environments. As an illustration, FIG. 10 depicts a server access architecture within which the disclosed systems and methods may be used (e.g., as shown at 30 in FIG. 10). The architecture in this example includes a corporation's local network 890 and a variety of computer systems residing within the local network 890. These systems can include application servers 820 such as Web servers and e-mail servers, user workstations running local clients 830 such as e-mail readers and Web browsers, and data storage devices 810 such as databases and network connected disks. These systems communicate with each other via a local communication network such as Ethernet 850. Firewall system 840 resides between the local communication network and Internet 860. Connected to the Internet 860 are a host of external servers 870 and external clients 880.

Local clients 830 can access application servers 820 and shared data storage 810 via the local communication network. External clients 880 can access external application servers 870 via the Internet 860. In instances where a local server 820 or a local client 830 requires access to an external server 870 or where an external client 880 or an external server 870 requires access to a local server 820, electronic communications in the appropriate protocol for a given application server flow through "always open" ports of firewall system 840.

A system 30 as disclosed herein may be located in a hardware device or on one or more servers connected to the local communication network such as Ethernet 880 and logically interposed between the firewall system 840 and the local servers 820 and clients 830. Application-related electronic communications attempting to enter or leave the local communications network through the firewall system 840 are routed to the system 30.

In the example of FIG. 10, system 30 could be configured to store and process reputation data about many millions of senders as part of a threat management system. This would allow the threat management system to make better informed decisions about allowing or blocking electronic mail (e-mail).

System 30 could be used to handle many different types of e-mail and its variety of protocols that are used for e-mail transmission, delivery and processing including SMTP and POP3. These protocols refer, respectively, to standards for communicating e-mail messages between servers and for server-client communication related to e-mail messages. These protocols are defined respectively in particular RFC's (Request for Comments) promulgated by the IETF (Internet Engineering Task Force). The SMTP protocol is defined in RFC 821, and the POP3 protocol is defined in RFC 1939.

Since the inception of these standards, various needs have evolved in the field of e-mail leading to the development of further standards including enhancements or additional protocols. For instance, various enhancements have evolved to the SMTP standards leading to the evolution of extended SMTP. Examples of extensions may be seen in (1) RFC 1869 that defines a framework for extending the SMTP service by defining a means whereby a server SMTP can inform a client SMTP as to the service extensions it supports and in (2) RFC 1891 that defines an extension to the SMTP service, which allows an SMTP client to specify (a) that delivery status notifications (DSNs) should be generated under certain conditions, (b) whether such notifications should return the contents of the message, and (c) additional information, to be returned with a DSN, that allows the sender to identify both the recipient(s) for which the DSN was issued, and the transaction in which the original message was sent.

In addition, the IMAP protocol has evolved as an alternative to POP3 that supports more advanced interactions between e-mail servers and clients. This protocol is described in RFC 2060.

Other communication mechanisms are also widely used over networks. These communication mechanisms include, but are not limited to, Voice Over IP (VOIP) and Instant Messaging. VoIP is used in IP telephony to provide a set of facilities for managing the delivery of voice information using the Internet protocol (IP). Instant Messaging is a type of communication involving a client which hooks up to an instant messaging service that delivers communications (e.g., conversations) in realtime.

As the Internet has become more widely used, it has also created new troubles for users. In particular, the amount of spam received by individual users has increased dramatically in the recent past. Spam, as used in this specification, refers to any communication receipt of which is either unsolicited or not desired by its recipient. A system and method can be configured as disclosed herein to address these types of unsolicited or undesired communications. This can be helpful in that e-mail spamming consumes corporate resources and impacts productivity.

It is further noted that the systems and methods disclosed herein may use data signals conveyed via networks (e.g., local area network, wide area network, internet, etc.), fiber optic medium, carrier waves, wireless networks, etc. for communication with one or more data processing devices. The data signals can carry any or all of the data disclosed herein that is provided to or from a device.

Additionally, the methods and systems described herein may be implemented on many different types of processing devices by program code comprising program instructions that are executable by one or more processors. The software program instructions may include source code, object code, machine code, or any other stored data that is operable to cause a processing system to perform methods described herein.

The systems' and methods' data (e.g., associations, mappings, etc.) may be stored and implemented in one or more different types of computer-implemented ways, such as different types of storage devices and programming constructs (e.g., data stores, RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that software instructions or a module can be implemented for example as a subroutine unit of code, or as a software function unit of code, or as an object (as in an object-oriented paradigm), or as an applet, or in a computer script language, or as another type of computer code or firmware. The software components and/or functionality may be located on a single device or distributed across multiple devices depending upon the situation at hand.

It should be understood that as used in the description herein and throughout the claims that follow, the meaning of "a," "an," and "the" includes plural reference unless the context clearly dictates otherwise. Also, as used in the description herein and throughout the claims that follow, the meaning of "in" includes "in" and "on" unless the context clearly dictates otherwise. Finally, as used in the description herein and throughout the claims that follow, the meanings of "and" and "or" include both the conjunctive and disjunctive and may be used interchangeably unless the context clearly dictates otherwise; the phrase "exclusive or" may be used to indicate situation where only the disjunctive meaning may apply.

It is claimed:

1. A computer-implemented method for operation upon one or more data processors to classify communications from messaging entities, comprising:
receiving a communication from a messaging entity via a communication network interface;
storing the communication in computer memory;
using a plurality of message classification techniques executed by a data processor to classify the stored communication; and
combining the outputs of the message classification techniques using the data processor to generate a message profile score;
wherein the message profile score is used by a communication filter in deciding what action is to be taken with respect to the communication associated with the messaging entity;
wherein a tuner is used to adjust confidence values associated with the message classification outputs, the tuner operating upon the data processor using a genetic algorithm including a fitness function modeling the fitness of candidate solutions to a problem domain associated with the message classification techniques, the fitness function comprising the equation:

$$\text{Fitness} = \frac{\sum |S_{CAT1\_MISTAKES\ i} - T|}{N_{CAT1}} + C \times \frac{\sum |S_{CAT2\_MIKSTAKES\ i} - T + 1|}{N_{CAT2}}$$

wherein $N_{CAT1}$ comprises number of message vectors from the overall data set that belong to a first category, $N_{CAT2}$ is number of message vectors from the overall data set that belong to a second category, C comprises a constant multiplier for misclassified messages from the second category, $S_{CAT1\_MIKSTAKESi}$ comprises a message profile score of message vector i from the first message category that has been misclassified to belong in the other category, $S_{CAT2\_MIKSTAKESi}$ comprises a message profile score of message vector i from the second message category that has been misclassified to belong in the other category, and T comprises a message profile numeric threshold above which a message is considered to belong to the first category.

2. The computer-implemented method of claim 1, wherein the communication is a e-mail message or VoIP communication or Instant Messaging communication.

3. The computer-implemented method of claim 1, wherein the communication is a legitimate e-mail message or spam or a virus or a communication that violates corporate policy.

4. The computer-implemented method of claim 1, wherein the message classification techniques include at least two techniques selected from the group: a Reverse DNS (RDNS) classification technique, Real-time Black-hole Lists (RBLs) classification technique, reputation server classification technique, signature-based classification technique, fingerprint-ing-based classification technique, message header analysis classification technique, sender authentication set of classification techniques, Bayesian filtering statistical classification technique, clustering classification technique, and content filtering classification technique.

5. The computer-implemented method of claim 1, wherein each message classification technique is associated with a confidence value which is used in generating a message classification output from the message classification technique.

6. The computer-implemented method of claim 5, wherein a filter value from each of the classification techniques is multiplied by its associated confidence value in order to generate the message classification output.

7. The computer-implemented method of claim 6, further comprising:
iterating through the classification techniques and allowing each technique to attempt to classify the message;
wherein the output of each classification is a numeric value, textual value, or categorical value.

8. The computer-implemented method of claim 7, wherein the message profile score is determined by:

$$Score = \sum_{i=1}^{N} SV_i \times C_i$$

wherein $SV_i$ is a confidence value associated with classification technique i, and $C_i$ is a classification technique output produced by classification technique i.

9. The computer implemented method of claim 7, wherein the message profile score is determined by:

$$Score = \sum_{i=1}^{N} (SV_{1i} \times C_i + SV_{2i} \times C_i^2)$$

wherein $SV_{1i}$, and $SV_{2i}$ are confidence values associated with classification technique i, and Ci is a classification technique output produced by classification technique i.

10. The computer-implemented method of claim 1, wherein at least one of the message classification techniques includes a reputation scoring technique; wherein the reputation scoring technique assigns a reputation probability to a messaging entity; wherein the reputation indicative probability indicates reputability of a messaging entity based upon extent to which the identified one or more communication's characteristics exhibit or conform to one or more reputation-related criteria.

11. The computer-implemented method of claim 1, wherein the communication was sent over a network.

12. A system for operation upon one or more data processors to classify communications from messaging entities, comprising:
a plurality of message classification engines stored in one or more computer readable media and causing one or more data processors to classify a communication received from a messaging entity;
a message profiling engine stored in any of the one or more computer readable media and causing one or more of the data processors to combine the message classification outputs from the classification engines, thereby generating a message profile score;
wherein the message profile score is used by message filtering systems in deciding what action is to be taken with respect to the communication associated with the messaging entity;
wherein a tuner is used to adjust confidence values associated with the message classification outputs, the tuner using a genetic algorithm including a fitness function modeling the fitness of candidate vector solutions for the confidence values, the fitness function expressing cost associated with the mistakes that a candidate vector solution made in attempting to correctly classify messages in a set of pre-classified data.

13. The system of claim 12, wherein the communication is a e-mail message or VoIP communication or Instant Messaging communication.

14. The system of claim 12, wherein the communication is a legitimate message or unwanted communication or a communication violative of a pre-selected policy.

15. The system of claim 14, wherein an unwanted communication includes a spam or virus communication;
wherein the pre-selected policy includes a corporate communication policy, a messaging policy, a legislation or regulatory policy, or an international communication policy.

16. The system of claim 12, wherein the message classification engines include at least two techniques selected from the group: Reverse DNS (RDNS) classification technique, Real-time Black-hole Lists (RBLs) classification technique, reputation server classification technique, signature-based classification technique, fingerprinting-based classification technique, message header analysis classification technique, sender authentication set of classification techniques, Bayesian filtering statistical classification technique, clustering classification technique, and content filtering classification technique.

17. The system of claim 12, wherein each message classification engine is associated with a confidence value which is used in generating a message classification output from the message classification engine.

18. The system of claim 17, wherein a filter value from each of the classification engines is multiplied by its associated confidence value in order to generate the message classification output.

19. The system of claim 18, wherein the output of each classification engine is a numeric value, textual value, or categorical value.

20. The system of claim 12, wherein the fitness function comprises:

$$Fitness = \frac{\sum |S_{CAT1\_MISTAKES\ i} - T|}{N_{CAT1}} + C \times \frac{\sum |S_{CAT2\_MIKSTAKES\ i} - T + 1|}{N_{CAT2}}$$

wherein $N_{CAT1}$ is number of message vectors from the overall data set that belong to a first category;
wherein $N_{CAT2}$ is number of message vectors from the overall data set that belong to a second category;
wherein C is a constant multiplier for misclassified messages from the second category;
wherein $S_{CAT1\_MIKSTAKESi}$, is a message profiler score of message vector i from the first message category that has been misclassified to belong in the other category;
wherein $S_{CAT2\_MIKSTAKESi}$, is a message profiler score of message vector i from the second message category that has been misclassified to belong in the other category; and
wherein T is a message profiler numeric threshold above which a message is considered to belong to the first category.

21. The system of claim 12, wherein the system is configured to operate with adaptive message blocking and whitelisting.

22. The system of claim 12, wherein at least one of the message classification engines includes a reputation scoring technique; wherein the reputation scoring technique assigns a reputation probability to a messaging entity; wherein the reputation indicative probability indicates reputability of a messaging entity based upon extent to which the identified one or more communication's characteristics exhibit or conform to one or more reputation-related criteria.

23. The system of claim 12, wherein the communication was sent over a network.

24. A system for operation upon one or more data processors to classify communications from messaging entities, comprising:
 means for receiving a communication that was sent over a network from a messaging entity;
 means for using a plurality of message classification techniques to classify the communication;
 wherein each message classification technique is associated with a confidence value which is used in generating a message classification output for the message classification technique;
 means for combining the message classification outputs in order to generate a message profile score;
 wherein the message profile score is used in deciding what action is to be taken with respect to the communication associated with the messaging entity; and
 wherein a tuner is used to adjust confidence values associated with the message classification outputs, the tuner using a genetic algorithm including a fitness function modeling the fitness of candidate vector solutions for the confidence values, the fitness function expressing cost associated with the mistakes that a candidate vector solution made in attempting to correctly classify messages in a set of pre-classified data.

25. An article of manufacture comprising instructions stored in one or more computer readable storage media and executable by a processing system, and upon such execution causing the processing system to perform operations comprising:
 receiving a communication that was sent over a network from a messaging entity;
 using a plurality of message classification techniques to classify the communication;
 combining the message classification outputs from the classification techniques in order to generate a message profile score;
 wherein the message profile score is used in deciding what action is to be taken with respect to the communication associated with the messaging entity;
 wherein a tuner is used to adjust confidence values associated with the message classification outputs, the tuner using a genetic algorithm including a fitness function modeling the fitness of candidate vector solutions for the confidence values, the fitness function expressing cost associated with the mistakes that a candidate vector solution made in attempting to correctly classify messages in a set of pre-classified data.

26. The article of claim 25, wherein the digital signal includes packetized data that is transmitted through the network.

27. A computer-implemented method for operation upon one or more data processors for tuning message classification parameters for use by a plurality of message classification techniques, comprising:
 receiving a plurality of input data via a communication network interface that is representative of a plurality of communications;
 storing the data in computer memory;
 using a tuner program operating on the one or more data processors to tune the message classification parameters associated with the message classification techniques;
 wherein a communication is received via the communications interface from a messaging entity;
 wherein the tuned message classification parameters are used by the plurality of message classification techniques executed by the one or more data processors to classify the received communication;
 wherein message classification outputs from the plurality of message classification techniques executed by the one or more data processors are combined by the one or more data processors in order to generate a message profile score;
 wherein the message profile score is used by a messaging filter in deciding what action is to be taken with respect to the communication associated with the messaging entity;
 wherein the tuner program operating on the one or more data processors is used to adjust confidence values associated with the message classification outputs, the tuner program using a genetic algorithm including a fitness function modeling the fitness of candidate vector solutions for the confidence values, the fitness function expressing cost associated with the mistakes that a candidate vector solution made in attempting to correctly classify messages in a set of pre-classified data.

28. The computer-implemented method of claim 27, wherein the message classification parameters include confidence values.

29. The computer-implemented method of claim 28, wherein the tuner program uses a heuristic approach in order to tune the confidence values.

30. The computer-implemented method of claim 27, wherein the fitness function is:

$$\text{Fitness} = \frac{\sum |S_{CAT1\_MISTAKES\ i} - T|}{N_{CAT1}} + C \times \frac{\sum |S_{CAT2\_MIKSTAKES\ i} - T + 1|}{N_{CAT2}}$$

wherein $N_{CAT1}$ is number of message vectors from the overall data set that belong to a first category;
 wherein $N_{CAT2}$ is number of message vectors from the overall data set that belong to a second category;
 wherein C is a constant multiplier for misclassified messages from the second category;
 wherein $S_{CAT1\_MIKSTAKESi}$, is a message profiler score of message vector i from the first message category that has been misclassified to belong in the other category;
 wherein $S_{CAT2\_MIKSTAKESi}$, is a message profiler score of message vector i from the second message category that has been misclassified to belong in the other category;
 wherein T is a message profiler numeric threshold above which a message is considered to belong to the first category.

31. The computer-implemented method of claim 27, wherein the method is configured to operate with adaptive message blocking and whitelisting.

32. The computer-implemented method of claim 27, wherein the received communication is a e-mail message or VoIP communication or Instant Messaging communication.

33. The computer-implemented method of claim 27, wherein the received communication is a legitimate e-mail message or spam or a virus or a communication that violates corporate policy.

34. The computer-implemented method of claim 27, wherein the message classification techniques include at least two techniques selected from the group: a Reverse DNS (RDNS) classification technique, Real-time Black-hole Lists (RBLs) classification technique, reputation server classification technique, signature-based classification technique, fingerprinting-based classification technique, message header analysis classification technique, sender authentication set of classification techniques, Bayesian filtering statistical classification technique, clustering classification technique, and content filtering classification technique.

35. The computer-implemented method of claim 27, wherein the message classification parameters include confidence values;
   wherein a message classification technique is associated with a confidence value which is used in generating a message classification output from the message classification technique.

36. The computer-implemented method of claim 35, wherein a filter value from each of the classification techniques is multiplied by its associated confidence value in order to generate a message classification output.

37. The computer-implemented method of claim 36, further comprising:
   iterating through the classification techniques and allowing each technique to attempt to classify the message;
   wherein the output of each classification is a numeric value, textual value, or categorical value.

38. The computer-implemented method of claim 27, wherein at least one of the message classification techniques includes a reputation scoring technique; wherein the reputation scoring technique assigns a reputation probability to a messaging entity; wherein the reputation indicative probability indicates reputability of a messaging entity based upon extent to which the identified one or more communication's characteristics exhibit or conform to one or more reputation-related criteria.

39. The computer-implemented method of claim 27, wherein the communication was sent over a network.

40. A system for operation upon one or more data processors for tuning message classification parameters for use by one or more message classification techniques, comprising:
   a communication network interface to receive a plurality of input data that is or is representative of a plurality of communications;
   storing the data in computer memory;
   a tuner program operating on the one or more data processors to tune the message classification parameters associated with the message classification techniques;
   wherein a communication is received from a messaging entity via a communications interface;
   wherein the tuned message classification parameters are used by the plurality of message classification techniques executed by the one or more data processors to classify the communication;
   wherein message classification outputs from the plurality of message classification techniques executed by the one or more data processors are combined in order to generate a message profile score;
   wherein the message profile score is used by a communications filter in deciding what action is to be taken with respect to the communication associated with the messaging entity;
   wherein the tuner program operating on the one or more data processors is used to adjust confidence values associated with the message classification outputs, the tuner program using a genetic algorithm including a fitness function modeling the fitness of candidate vector solutions for the confidence values, the fitness function expressing cost associated with the mistakes that a candidate vector solution made in attempting to correctly classify messages in a set of pre-classified data.

\* \* \* \* \*

UNITED STATES PATENT AND TRADEMARK OFFICE
CERTIFICATE OF CORRECTION

PATENT NO. : 8,132,250 B2
APPLICATION NO. : 11/173941
DATED : March 6, 2012
INVENTOR(S) : Paul Judge et al.

It is certified that error appears in the above-identified patent and that said Letters Patent is hereby corrected as shown below:

Claim 1, Column 12, Line 36 (approximate), delete " $\frac{\sum |S_{CAT2\_MIKSTAKES\ i} - T + 1|}{N_{CAT2}}$ "

and insert -- $\frac{\sum |S_{CAT2\_MISTAKES\ i} - T + 1|}{N_{CAT2}}$ --, therefor.

Claim 1, Column 12, Line 44, delete "$S_{CAT1\_MIKSTAKESi}$" and insert -- $S_{CAT1\_MISTAKESi}$ --, therefor.

Claim 1, Column 12, Line 47, delete "$S_{CAT2\_MIKSTAKESi}$" and insert -- $S_{CAT2\_MISTAKESi}$ --, therefor.

Claim 9, Column 13, Line 38, delete "Ci" and insert -- $C_i$ --, therefor.

Claim 20, Column 14, Line 49 (approximate), delete " $\frac{\sum |S_{CAT2\_MIKSTAKES\ i} - T + 1|}{N_{CAT2}}$ "

and insert -- $\frac{\sum |S_{CAT2\_MISTAKES\ i} - T + 1|}{N_{CAT2}}$ --, therefor.

Claim 20, Column 14, Line 58, delete "$S_{CAT1\_MIKSTAKESi'}$" and insert -- $S_{CAT1\_MISTAKESi'}$ --, therefor.

Claim 20, Column 14, Line 61, delete "$S_{CAT2\_MIKSTAKESi'}$" and insert -- $S_{CAT2\_MISTAKESi'}$ --, therefor.

Claim 30, Column 16, Line 44 (approximate), delete " $\frac{\sum |S_{CAT2\_MIKSTAKES\ i} - T + 1|}{N_{CAT2}}$ "

Signed and Sealed this
Twenty-sixth Day of June, 2012

David J. Kappos
*Director of the United States Patent and Trademark Office*

CERTIFICATE OF CORRECTION (continued)
U.S. Pat. No. 8,132,250 B2 and insert -- $\dfrac{\sum |S_{CAT2\_MISTAKES\ i} - T + 1|}{N_{CAT2}}$ --, therefor.

Claim 30, Column 16, Line 53, delete "$S_{CAT1\_MIKSTAKESi}$," and insert -- $S_{CAT1\_MISTAKESi}$, -- therefor.

Claim 30, Column 16, Line 56, delete "$S_{CAT2\_MIKSTAKESi}$," and insert -- $S_{CAT2\_MISTAKESi}$, -- therefor.